(12) United States Patent
Meyer

(10) Patent No.: US 6,470,195 B1
(45) Date of Patent: Oct. 22, 2002

(54) METHOD AND APPARATUS FOR MODELING A SMART ANTENNA IN A NETWORK PLANNING TOOL

(75) Inventor: Ronald L. Meyer, Parker, TX (US)

(73) Assignee: Raytheon Company, Lexington, MA (US)

( * ) Notice: Subject to any disclaimer, the term of this patent is extended or adjusted under 35 U.S.C. 154(b) by 30 days.

(21) Appl. No.: 09/703,382

(22) Filed: Oct. 31, 2000

(51) Int. Cl.[7] .............................. H04B 1/38; H04M 1/00
(52) U.S. Cl. ........................ 455/562; 455/446; 455/450; 455/436
(58) Field of Search ................................. 455/452, 451, 455/447, 25, 562, 437, 436, 442, 450, 453, 446; 342/373

(56) References Cited

U.S. PATENT DOCUMENTS

| | | | | |
|---|---|---|---|---|
| 5,890,067 A | * | 3/1999 | Chang | 455/446 |
| 5,960,330 A | * | 9/1999 | Azuma | 455/70 |
| 5,966,094 A | * | 10/1999 | Ward | 455/70 |
| 6,104,930 A | * | 8/2000 | Ward | 455/450 |
| 6,259,918 B1 | * | 7/2001 | Labonte | 455/437 |

OTHER PUBLICATIONS

Marketing flyer entitled "New in Site Planner 4.0", Wireless Valley Communications, Inc., Nov. 2, 1999, 2 sheets.

* cited by examiner

Primary Examiner—Vivian Chin
Assistant Examiner—John J Lee
(74) Attorney, Agent, or Firm—Baker Botts L.L.P.

(57) ABSTRACT

A network planning tool (NPT) computer program is used to model characteristics of a wireless telephone network (10). The network contains a plurality of cells (12) which each include a plurality of sectors (16–18) disposed about a base station (13) that has a respective antenna for each sector. Techniques are provided for modeling smart antennas (131), including use of a switched-beam transmit and receive patterns with approximately random allocation among the beams of frequencies assigned to an associated sector. In the case of an adaptive beam-forming smart antenna, power levels for that antenna and a remote antenna operating at the same frequency are adjusted so as to increase a differential therebetween by an improvement value associated with the smart antenna. Potential uplink interference at a given base station is modeled by simulating operation of other base stations at an uplink frequency with a reduced power level. Potential interfering signals are discounted to the extent a smart antenna can intelligently reject a limited number of undesired signals.

25 Claims, 11 Drawing Sheets

METHOD AND APPARATUS FOR MODELING A SMART ANTENNA IN A NETWORK PLANNING TOOL

TECHNICAL FIELD OF THE INVENTION

This invention relates in general to wireless communication networks and, more particularly, to a method and apparatus for modeling a smart antenna in a network planning tool for a wireless communication network.

BACKGROUND OF THE INVENTION

During the last several years, wireless telephones have enjoyed an progressively increasing popularity among the general population in many countries. In order for a wireless telephone to operate, it must use radio signals to communicate with a wireless network which includes a number of spaced base stations, each of which has multiple antennas supported thereon. The entity that operates the wireless network is commonly referred to as a service provider. In the United States, each service provider is allocated a certain number of frequencies by the government. The service provider then allocates these assigned frequencies among the base stations of that service provider, in a repeating pattern. Each frequency can support only a limited number of telephone calls.

As the popularity of wireless telephony increases, there is progressively increasing pressure on each service provider to increase the call capacity of its wireless network. An increase in the number of available frequencies would increase the capacity, but this is not an option, because of governmental regulation. Accordingly, the service provider must add more base stations and antennas, and/or adjust the pattern of frequency allocation to have a higher density. Both of these techniques have the effect of decreasing the effective distance between base stations which use identical subsets of the allocated frequency set. This in turn increases the potential for interference within the system.

As one example, a wireless telephone attempting to receive signals from a nearby base station may also receive interfering signals from a remote base station operating on the same frequency, thereby causing the person using the telephone to simultaneously hear two conversations. As another example, a base station attempting to communicate with a nearby telephone may also receive signals from a more remote telephone attempting to communicate on the same frequency with a different base station, with the result that two telephone conversations become merged at the base station.

Techniques have been developed to minimize these potential interference problems, while still ensuring telephone calls of good quality. These techniques include adjusting the fixed transmit pattern of a standard antenna, adjusting the transmit power for an antenna, adjusting the height and downward angle of an antenna at a base station, and "clocking" the orientation of an antenna a few degrees about a vertical axis at the base station. More recently, these techniques have also included the use of base stations of reduced power, commonly known as micro cells or pico cells. While these techniques have been generally adequate to resolve most problems in the past, existing wireless networks are reaching the limit to which these techniques can reduce or eliminate interference, particularly in urban areas where base stations are relatively closely spaced.

One additional technique, which is a relatively recent development that has not yet been widely used, involves replacing a standard antenna with a more sophisticated type of antenna which is commonly known as a "smart" antenna. One type of existing smart antenna is commonly referred to as a switched-beam antenna, and another type of existing smart antenna is commonly referred to as an adaptive beam-forming antenna. Smart antennas have a degree of local intelligence in their operation, which effectively makes them variable pattern antennas rather than fixed pattern antennas, and which allows to them to effectively provide a form of spatial filtering.

Network planners use a type of software program known as a network planning tool (NPT) in order to model a network and the antennas in it, and in order to analyze possible problems such as potential interference. However, existing NPTs do not currently support the use of smart antennas, thus making it difficult or impossible for most network planners to easily integrate a smart antenna into an existing or new network design. One reason for this is that existing NPTs use relatively simple models for standard fixed pattern antennas, and it has been thought that smart antennas require much more sophisticated modeling techniques that cannot be easily integrated into a NPT. In this regard, some attempts have been made to model the operation of the variable patterns of smart antennas, but these attempts involved very sophisticated and complex techniques such as Monte Carlo simulation. As a practical matter, these efforts have basically been limited to academic laboratories and papers, rather than real-world applications, because of the complexity and time-consuming nature of techniques such as Monte Carlo simulation. That is, even if such techniques may work on a theoretical level, the time and complexity involved to carry out the associated calculations make these techniques impractical for NPTs that need to operate on a "real-time" basis. In other words, NPT programs using these techniques would run so slowly that they would not be very practical.

Nevertheless, the progressively increasing pressure to provide increased call capacity in existing wireless networks will create increasing pressure for the use of smart antennas in these networks. Consequently, network planners will have a progressively increasing need for NPTs that are capable of modeling smart antennas on an accurate but efficient basis.

SUMMARY OF THE INVENTION

From the foregoing, it may be appreciated that a need has arisen for a method and apparatus for modeling smart antennas in the context of wireless communication networks, in a manner which is accurate, simple and efficient.

According to one form of the present invention, this need is addressed by providing a method and apparatus that model a smart antenna which has a directional operating region and which is operative with respect to a frequency group that includes a plurality of frequencies which are different. The modeling involves: representing a transmit pattern of the smart antenna with a plurality of beams that each correspond to a respective different portion of the operating region; and assigning the frequencies of the group approximately randomly among the plurality of beams, each frequency of the frequency group being assigned to one of the beams.

According to a different form of the present invention, the need is met by providing a method and apparatus that model a wireless network which has a plurality of cells that each include at least two cell sections, and which has an antenna serving a first of the cell sections and capable of receiving signals transmitted at a selected frequency. The modeling involves: determining a first power level representing an effective power level as to the antenna for a first signal transmitted at the selected frequency by a hypothetical first mobile transmitter disposed within the first cell section; determining a second power level representing an effective power level as to the antenna for a second signal transmitted at the selected frequency by a hypothetical second mobile transmitter disposed within a second of the cell sections different from the first cell section; and evaluating whether a predetermined value is greater than a difference between the first and second power levels.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
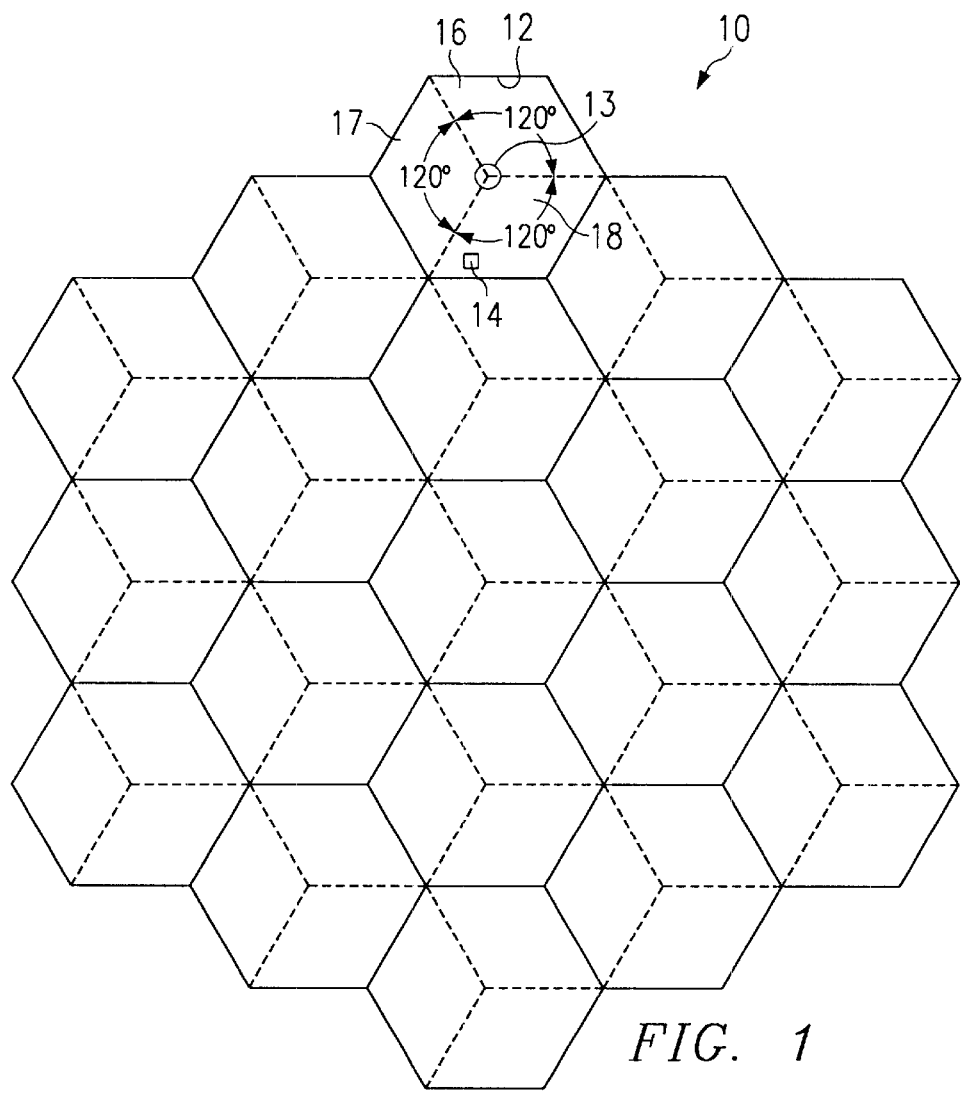
FIG. 1 is a diagrammatic top view of a wireless telephone network to which the principles of the present invention can be applied, including a plurality of cells, with a base station and a telephone disposed in one of the cells.

FIG. 1 is a diagrammatic top view of a portion of a wireless network 10 to which the principles of the present invention can be applied, in a manner discussed later. The network 10 serves a particular geographic region, and is divided into a plurality of cells, one of which is shown diagrammatically at 12. In FIG. 1, each cell is depicted as having the shape of a regular hexagon. Persons skilled in the art will recognize that, in actual practice, the shape of cells in the network may differ somewhat from cell to cell. However, for purposes of convenience, it is a common practice in the art to represent cells as regular hexagons, which is a reasonable approximation of an ideal cell.

Each of the cells 12 has at a center thereof a base station, one of which is shown diagrammatically at 13. Each base station has three antennas and associated circuitry, which are discussed in more detail later and which can be used to communicate with wireless telephones within that cell, one of which is shown diagrammatically at 14. As indicated by broken lines in FIG. 1, each cell is conceptually divided into three diamond-shaped sections of equal size which are called sectors, the sectors for the cell 12 being designated by reference numerals 16, 17 and 18. Each sector corresponds to an angle of 120° with respect to the base station, as indicated by the three double-headed arrows in cell 12. FIG. 1 depicts three sectors in each cell, because this is the practice commonly followed in the industry. However, it will be recognized that a cell could be divided into a larger or smaller number of sectors, and the present invention is not restricted to any particular number of sectors per cell.

Figure 2:
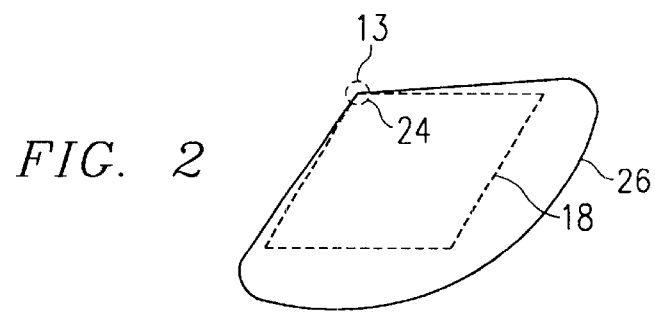
FIG. 2 is a diagrammatic top view of a sector which is a portion of one of the cells in FIG. 1, showing a transmit pattern for a standard sector antenna which is a part of the base station shown in FIG. 1.

In a traditional approach, each base station 13 has three separate antennas which each serve a respective one of the three sectors in the associated cell. For example, FIG. 2 is a diagrammatic view of the sector 18 in the cell 12 of FIG. 1, and the associated base station 13. The base station 13 has three antennas which each serve a respective one of the three sectors 16–18. FIG. 2 shows a standard sector antenna 24 which serves the sector 18, the antenna 24 transmitting a single pattern or "beam" 26 which serves the entire sector 18. In FIG. 2, the shape of the beam 26 represents the region within which the transmitted power is sufficiently strong to support good-quality telephone calls. It will be noted that the beam overlaps somewhat into adjacent sectors, but those sectors have different allocated frequencies, thus avoiding interference. Of course, the signals transmitted by the antenna 24 decrease progressively in power in a direction away from the antenna, and will thus continue propagating downwardly and rightwardly in FIG. 2 beyond the illustrated envelope 26, at a progressively decreasing power level. Thus, the envelope 26 shown in FIG. 2 is not intended to indicate the outer limit of the power transmitted by the antenna, but rather the region within which the beam has a power level that is above a selected threshold.

The base stations in the network 10 are all coupled to a not-illustrated central control computer of a known type, which coordinates the operation of the overall network. For example, assume that the telephone 14 is in a moving automobile. As the telephone moves from a first sector to a second sector during a telephone call, the central control computer will detect the change, identify a frequency in the second sector which can be assigned to the call, and instruct the base stations in both sectors that the telephone is to be shifted from its current frequency in the first sector to the new frequency in the second sector. The base station for the first sector will notify the telephone to change frequencies, and the telephone will make the frequency change. At the same time, signals traveling between the first base station and the other telephone in the call will be rerouted to travel between the other telephone and the second base station. This will all occur with no discernible interruption to the ongoing call.

In current technology, there are two common types of wireless telephones, which are respectively referred to as analog telephones and digital telephones, and which are discussed in more detail later. Further, there are various different standards used in the United States for communicating with wireless telephones, two of the most common being the Advanced Mobile Phone Service (AMPS) standard (which is used for analog telephones), and the Time Division Multiple Access (TDMA) standard (which is used for digital telephones). Further, there are less common standards, such as the Code Division Multiple Access (CDMA) standard, and the Global System for Mobile Communications (GSM) standard, which is used in a number of other countries.

For convenience and clarity, the discussion herein of the present invention is presented primarily in the context of digital telephones and the TDMA standard, and in particular a standard under TDMA which is commonly known as IS-136. In part, this reflects the fact that the future trend is toward the use of digital technology. However, it should be kept in mind that the present invention is in no way limited to this exemplary scenario, but is advantageous in a variety of other contexts involving either analog or digital telephones, and various different standards.

Under the TDMA standard, telephone calls use a technique commonly known as Frequency Division Duplex (FDD), where one frequency is used to transmit from a wireless telephone to a base station, and a different frequency is used to transmit from the base station to the telephone. Since the following discussion is presented in the context of TDMA, it inherently reflects FDD. However, there are alternative standards that use techniques other than FDD, such as Time Division Duplex (TDD). Under TDD, a single frequency is used for transmissions in both directions, and thus only one of the telephone and base station can be transmitting at any given point in time. Although the following discussion happens to be presented in the context of FDD, the present invention is not limited to FDD.

The network 10 shown in FIG. 1 represents the network of a single service provider for the geographic region of interest. There may be one or more other service providers who each serve the same region, and who thus each have a similar network for that region, but the network of each such service provider is operationally independent of the other networks, and can therefore be ignored for purposes of explaining the present invention. In the United States, under the TDMA and AMPS standards, the federal government assigns each service provider a group of 420 frequencies, where the frequencies assigned to each service provider are different from the frequencies assigned to every other service provider. As a practical matter, each service provider is actually assigned 420 pairs of frequencies, or in other words a total of 840 frequencies, but it is a common practice in the industry to refer to each such frequency pair in the singular as a "frequency". In each frequency pair, one of the frequencies is used for transmitting signals from the base station to the telephone, commonly referred to as "downlink" signals, and the other frequency is used for transmitting signals from the telephone to the base station, commonly referred to as "uplink" signals.

A given base station, such as the base station 13, will typically use a subset of the 420 frequencies assigned to the service provider which operates that base station. Under the IS-136 standard, one common technique for allocating frequencies among base stations is known as a 7/3 configuration, and is discussed in more detail later. For now, it is sufficient to explain that, in the 7/3 configuration, the service provider allocates to each cell 60 frequencies (which actually means 120 frequencies arranged in 60 pairs). These frequencies will in turn be allocated among the sectors in that cell. Thus, the beam 26 depicted in FIG. 2 for the antenna 24 represents transmissions to the sector 18 of downlink signals at 20 different frequencies. Sometimes, one of these frequencies will be used as a control channel rather than to carry telephone calls, but for purposes of the present discussion it is assumed that all frequencies are used for purposes of calls.

In a given cell, a particular frequency (frequency pair) can serve either one analog telephone, or several digital telephones. This is because an analog telephone requires continuous communication with the corresponding base station, whereas digital telephone technology uses time division multiplexing, for example under the TDMA standard, to provide several digital telephones with interleaved time slots on the same frequency, such that each digital telephone can use the assigned frequency a respective portion of the time. Under the IS-136 standard, a given frequency may be used by three or six digital telephones, and under the GSM standard up to eight telephones can use a single frequency. In the United States, the most common current approach under the TDMA and IS-136 standards is to permit three digital telephones to share a single frequency, such that each digital telephone can use the assigned frequency approximately one-third of the time. Since this is the most common scenario, the following discussion is presented in the specific context of this scenario. However, the present invention is not limited to any particular number of telephones per frequency.

Given the assumption that each frequency can be shared by up to three digital telephones, it will be recognized that a given base station in a given cell can serve three times as many digital telephones as analog telephones. Stated differently, a service provider can use its assigned frequency set to provide service to three times as many digital telephones as analog telephones within a given region, without adding any additional base stations or other equipment. This advantage is one of the reasons that service providers have strongly encouraged a shift from the use of analog telephones to the use of digital telephones, because it allows them to serve a significantly greater number of users without incurring the cost of adding additional equipment.

As discussed above, the 7/3 configuration used under the IS-136 standard provides that each cell will be assigned 60 frequencies (frequency pairs). Assuming for purposes of discussion that all of the telephones in the cell are digital telephones, each frequency will support three telephone calls, and thus the base station in the cell will support a total of 180 calls. In rural areas, the number of calls within a given cell will rarely approach the upper limit of 180 calls. In urban areas, however, the average number of users in a given cell will be much higher than in the typical rural cell, and can easily and frequently approach or exceed the upper limit of 180 calls. Thus, as the popularity of wireless telephones has rapidly and progressively increased, service providers have faced a progressively increasing need for capability to handle a progressively greater number of calls within certain geographic areas.

It would be possible to increase the number of telephone calls within a region by increasing the number of frequencies available to the service provider, but this is not an option because, as discussed above, government regulations restrict each service provider to a predetermined number of frequencies. Given that the number of frequencies is fixed, an alternative way of increasing the call capacity of a network is to reduce the sizes of the cells, which has the effect of increasing the total number of cells in a given geographic area. This has traditionally been accomplished by building new base stations between existing base stations. The practical effect is that the distance between base stations is decreased. In recent years, service providers have relied heavily on this technique of adding base stations to reduce cell size in order to increase the call capacity of the overall network.

However, there are practical limits to the ability to move base stations progressively closer to each other, because the potential problems of interference increase. Service providers have developed some techniques to combat interference, such as mounting base station antennas on very high poles and angling them downward toward the ground, in order to reduce the amount of transmitted energy which propagates outside the cell served by that base station. Nevertheless, many existing wireless networks, especially in urban areas, have reached the practical limits which apply to the addition of base stations and reduction of cell sizes.

Another known technique for increasing call capacity involves increasing the number of frequencies allocated to each cell, rather than reducing the physical size of each cell. In this regard, since the service provider is limited to a predetermined number of frequencies, this necessarily means that the total set of frequencies assigned to that service provider must be allocated among a smaller number of cells. In order to put this into context, the above-mentioned 7/3 configuration will now be discussed in more detail, along with an alternative 4/3 configuration.

Figure 3:
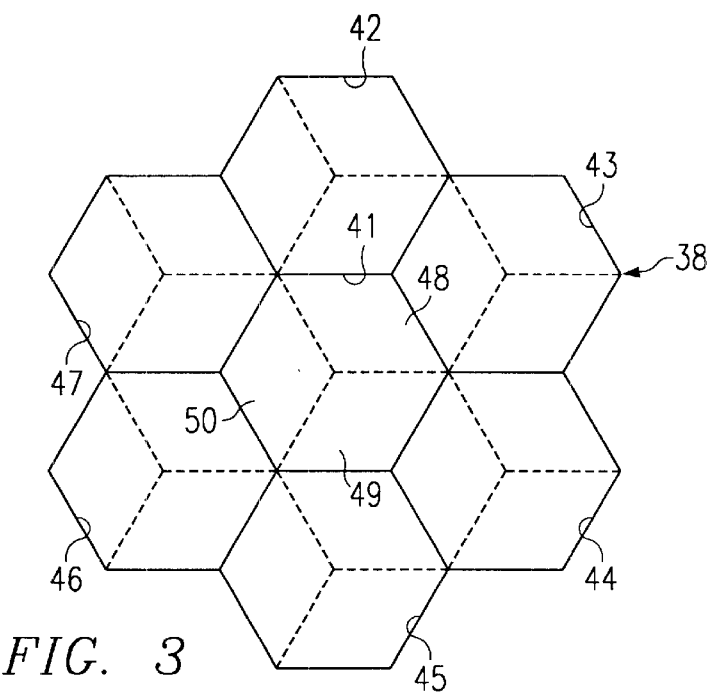
FIG. 3 is a diagrammatic top view of a group of cells which are configured to be used in a repeating pattern in a wireless network.

FIG. 3 is a diagrammatic top view of a group 38 of seven cells 41–47 which represents the 7/3 configuration discussed above. The term 7/3 reflects the fact that the group 38 includes seven cells that each have three sectors, for a total of twenty-one sectors. The 420 frequencies (frequency pairs) assigned to the service provider are allocated approximately equally among the cells, such that each sector would have 20 frequencies, and each cell would have 60 frequencies. The frequencies assigned to each sector in the group would not be used in any other sector within that same group. Thus, for example, sector 49 would be assigned a specific subset of 20 frequencies, and no other sector in the cell group 38 would use any of the frequencies in that particular subset.

Figure 4:
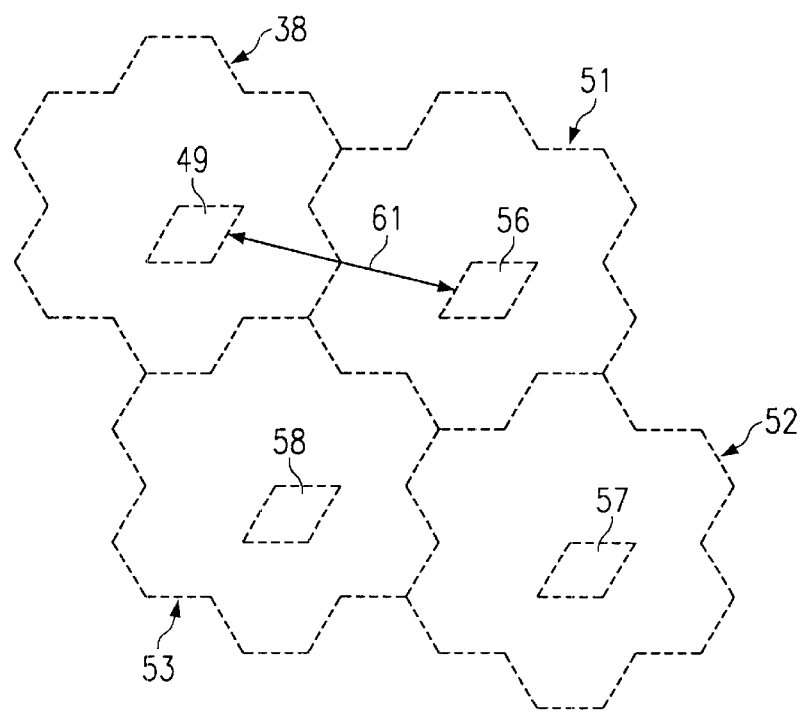
FIG. 4 is a diagrammatic top view of several cell groups of the type shown in FIG. 3, depicting the repeatable interrelationship of these groups.

FIG. 4 is a diagrammatic top view showing how the cell group 38 and several identical cell groups 51–53 would be combined in a typical network, to form a repeating cell group pattern. Each cell group would use all 420 frequencies, and the allocation pattern among the sectors would typically be the same in every cell. Thus, the subset of 20 frequencies assigned to sector 49 in cell group 38 would also be assigned to respective sectors 56–58 at equivalent physical locations within the respective cell groups 51–53. It will be noted that the shortest distance between two sectors using the same frequency subset is the distance 61, for example the distance between sectors 49 and 56.

Figure 5:
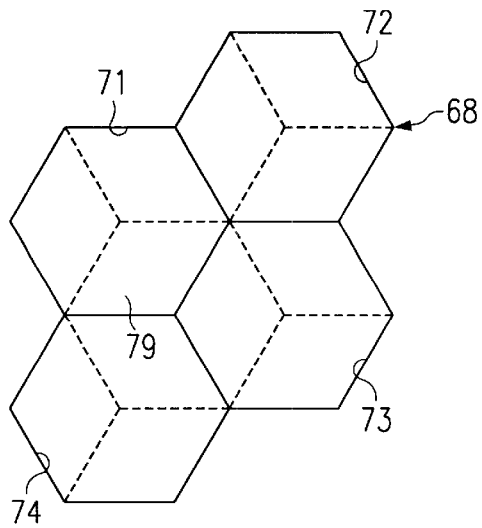
FIG. 5 is a diagrammatic top view of a different group of cells which are configured to be used in a repeating pattern in a wireless network, and which provide a higher call capacity than the group shown in FIG. 3.

FIG. 5 is a diagrammatic top view of a group 68 of four cells 71–74, which represents the alternative frequency allocation configuration commonly known as the 4/3 configuration. The term 4/3 refers to the fact that the group includes four cells which each have three sectors, or in other words a total of twelve sectors. A service provider would allocate its assigned 420 frequencies (frequency pairs) approximately equally among the sectors, such that each sector would have 35 frequencies and each cell would have 105 frequencies. Thus, for example, the 35 frequencies in the subset assigned to the sector 79 would not be used anywhere else within the cell group 68.

Assuming that the cells 71–74 in FIG. 5 are the same size as the cells 41–47 in FIG. 3, it will be recognized that the service provider does not need to invest in additional hardware, because the existing base stations with their existing spacing can be used. Moreover, since the cells 41–47 in FIG. 3 can each handle 180 digital calls, whereas the cells 71–74 in FIG. 5 can each handle 315 digital calls, the call capacity of a given cell is increased by 75% as a result of switching from the 7/3 configuration to the 4/3 configuration.

Figure 6:
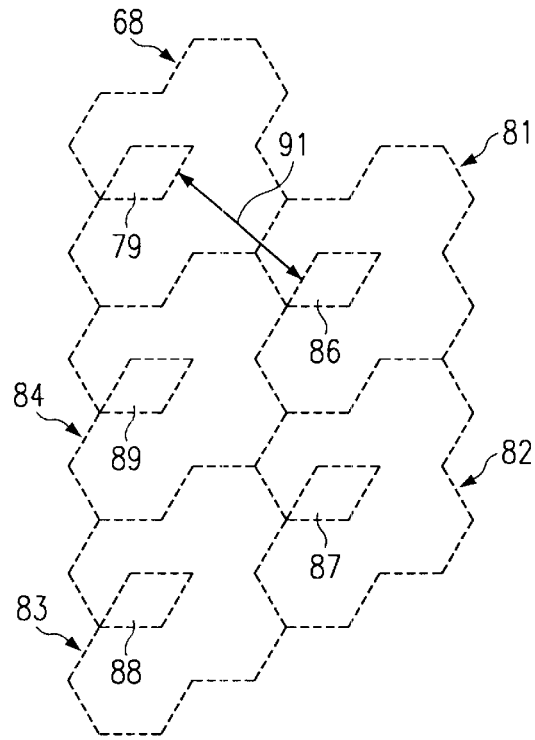
FIG. 6 is a diagrammatic top view of several cell groups of the type shown in FIG. 5, depicting the repeatable interrelationship of these groups.

FIG. 6 is a diagrammatic top view showing how the cell group 68 and several equivalent cell groups 81–84 would be combined in a repeating pattern to form a network. Sectors 79 and 86–89 are the sectors which use the same subset of available frequencies. The shortest spacing between two such sectors is indicated at 91. Still assuming that an individual cell in FIG. 6 is the same size as an individual cell in FIG. 4, it will be recognized that the distance 91 is only about 75% of the distance 61. Thus, while each cell in FIG. 6 realizes the 75% increase in call capacity over the cells in FIG. 4, the sectors which use the same set of frequencies are somewhat closer in FIG. 6 than in FIG. 4, thereby increasing the possibility that electromagnetic signals transmitted at a given frequency in one sector may interfere with electromagnetic signals transmitted at that frequency in some other sector.

Summarizing, the primary techniques for increasing call capacity within a network are to reduce the size of the cells, to shift to a different frequency allocation configuration (for example from a 7/3 configuration to a 4/3 configuration), or to use a combination of these two techniques. Both techniques inherently result in a reduction in the distance between respective sectors that are each allocated the same subset of frequencies. Consequently, in planning a new network, or changes to an existing network, the evaluation of potential electromagnetic interference is becoming a progressively more significant consideration. The discussion which follows will, for simplicity and clarity, discuss network planning implications in the specific context of TDMA and a 7/3 configuration of the type shown in FIGS. 3 and 4. However, these techniques are equally applicable to other network configurations, such as the 4/3 configuration shown in FIGS. 5 and 6.

Figure 7:
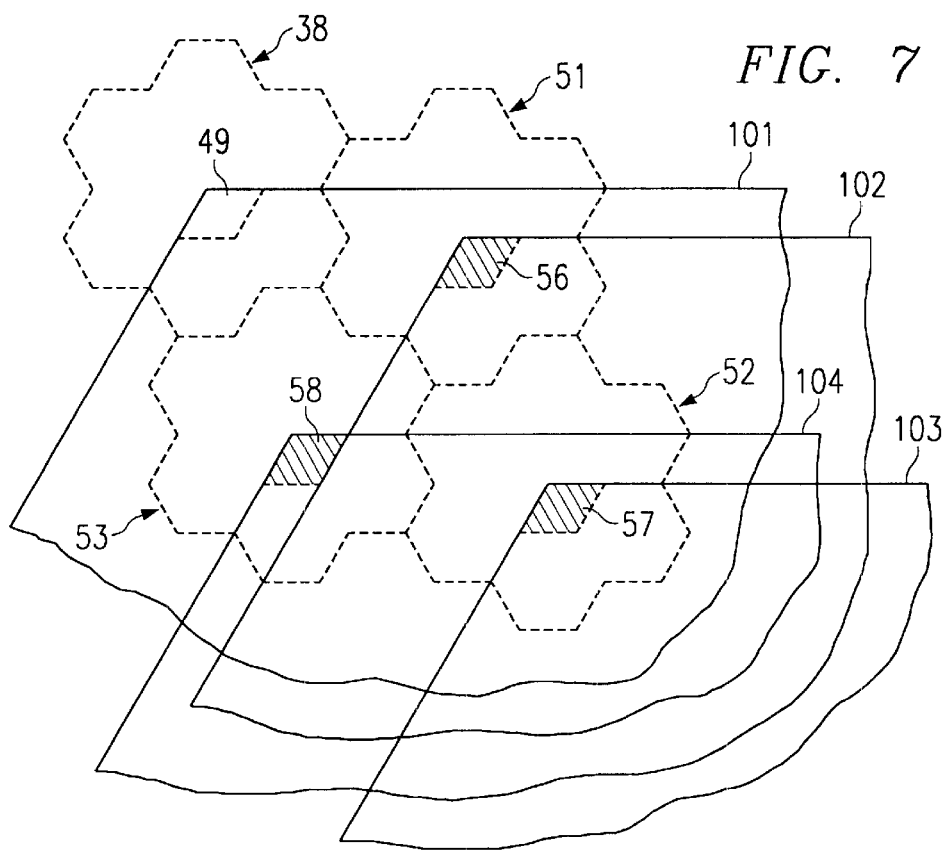
FIG. 7 is a diagrammatic top view similar to FIG. 4, but also showing the transmit pattern for a respective selected antenna in each cell group.

FIG. 7 is a diagrammatic top view of the cell groups 38 and 51–53 of FIG. 4, but also shows the transmission patterns 101–104 for the antennas serving each of the sectors 49 and 56–58. The hatching in sectors 56–58 reflects the fact that there is potential for electromagnetic interference. For example, sector 56 is served by beam 102, but it is possible that the power level of beam 101 could be strong enough in sector 56 to create an interference problem. Similarly, sector 58 is served by beam 104, but it is possible that the power level of beam 101 could be strong in sector 58 to create an interference problem. Further, sector 57 is served by beam 103, but any one of beams 101, 102 and 103 could be strong enough in sector 57 to create an interference problem.

In designing a network, for example the network of FIG. 7, there are two competing considerations. First, in order to support a telephone call of acceptable quality within a given sector, the beam transmitted by the base station to a telephone within that sector must have a power level above a predetermined threshold at all locations within that sector. This is commonly referred to as coverage. There are a number of factors which influence coverage, including the power level at which the beam is transmitted from the antenna, and other factors which influence how the electromagnetic energy propagates away from the antenna, such as terrain type and antenna angle. With respect to terrain type, a signal propagating outwardly from an antenna will experience a significantly greater rate of attenuation in a cluttered terrain type such as an urban area where there are many tall buildings, in comparison to a non-cluttered terrain type such as a rural setting with a flat prairie having few trees. With respect to antenna angle, when the antenna is oriented to transmit the signal approximately horizontally outwardly, the signal will propagate substantially further than if the same antenna is mounted on a higher post and angled to transmit its outgoing signal downwardly at an angle toward the ground.

It would be easy to obtain satisfactory coverage throughout a sector by simply transmitting the signal at a relatively high power level from the antenna for that sector. However, this also increases the attenuated power level that the signal will have when it reaches other sectors using that same frequency set. Consequently, there are competing considerations between the desirability to transmit a signal at a high power level so that it is effective within its own sector, and the desirability to transmit it at a low power level so that it does not create interference in other sectors.

In this regard, it is recognized in the industry that, in order to support a telephone call of acceptable quality between a wireless digital telephone and a base station, the signals received by each from the other should be higher than a minimum threshold level and, for IS-136, should also be at least 21 dB higher than signals at the same frequencies which are above the threshold and are received from telephones or base stations in other sectors. (In the case of a wireless analog telephone, this differential is 17 dB). If the local signals are above the minimum threshold but the signals from other sectors are below that threshold, then a differential of only about 6 dB is sufficient. (A lower differential may be sufficient under standards other than IS-136). In planning the network, the network planner must balance the competing considerations of "coverage" and "interference" throughout the network, and must do so for each of hundreds of frequencies. In order to do this, network planners commonly use a type of computer program known as a network planning tool (NPT).

The NPT program is provided with information such as the locations of base stations, the types of antennas to be used at each base station, the intended power levels for transmitted signals at each antenna, the heights at which the antennas are mounted, the angles at which the antennas are oriented, and the type of terrain in the sector associated with each antenna. Information about terrain type can be developed empirically, or can be obtained from the United States Geological Service (USGS). In this regard, the USGS has identified a number of predefined terrain types, but existing NPTs typically use only about four to six of these predefined terrain types.

Using input information of this type, the NPT program first calculates coverage information through the region of interest. In effect, with respect to the beam transmitted by each antenna, the NPT calculates, at each of a plurality of different points within the transmission coverage pattern for that antenna, the power level which the signal is expected to have after taking into account all of the various factors that can affect power level, such as transmission power, antenna angle, attenuation due to terrain type, and so forth. The system planner can then verify that, at all points within the sector served by that antenna, the power level is above the minimum threshold that is required to support a telephone call. If the planner determines that proper coverage is not present in a portion of a particular sector, then an appropriate adjustment is made, for example by changing the angle of the antenna for that sector, by increasing the power level of the transmitted signal for that sector, or by selecting a different type or style of antenna. Then, the coverage information is determined again and verified to be adequate.

Once the planner has verified that adequate coverage is present, then the NPT uses the coverage information to compute interference information. For example, with reference to the sector 57 in FIG. 7, the NPT would evaluate the difference between the transmitted power levels of the beams 103 and 101 at each of the points located within the sector 57. Also, the NPT would calculate the difference between the transmitted power levels of beams 103 and 102 at each such point, and the difference between the power levels of beams 103 and 104 at each such point. In other words, within the sector 57, this would be carried out for the beam 103 relative to every other beam which is using the same set of frequencies, but not with respect to beams that use a different set of frequencies and thus do not present a potential interference problem.

The network planner would then review this interference information provided by the NPT, in order to determine the extent to which there is a potential for interference. In essence, and with reference to the foregoing discussion, the network planner attempts to ensure that, at each point within a given sector, the beam associated with that sector is at least 21 dB higher than the beam from any other sector which has the same frequency set and which is above the minimum threshold. (It will be noted that, if the 21 dB differential needed for digital wireless telephones is present, then the 17 dB differential needed for analog wireless telephones will also be automatically present). If a potential interference problem is identified, then the network planner makes appropriate adjustments. Examples of possible adjustments include relocating a base station (if has not yet been built), replacing a sector antenna with a different sector antenna having a slightly different pattern, decreasing the transmission power of a given antenna, adjusting the mounting height and angle of a given antenna, or "clocking" an antenna by adjusting it a few degrees about a vertical axis. If only one or two frequencies are problematic, the network planner may be able to resolve a problem by locally reassigning a problematic frequency from one sector to another, or by locally swapping a problematic frequency with a frequency in an adjacent sector. After making one or more adjustments of this type, both the coverage and interference evaluations must be carried out again.

There is an additional consideration which, in the past, has typically been overlooked. However, it has become a progressively more significant factor as cell sizes have decreased and/or frequency allocation configurations have changed. This consideration relates to interference which might be seen by a base station as a result of two different uplink signals transmitted at the same frequency by respective telephones located in two different sectors. Traditional NPTs have typically considered interference only from the point of view of interference that might be seen by a telephone as a result of two different downlink signals transmitted at the same frequency by respective base stations located in two different sectors.

Figure 8:
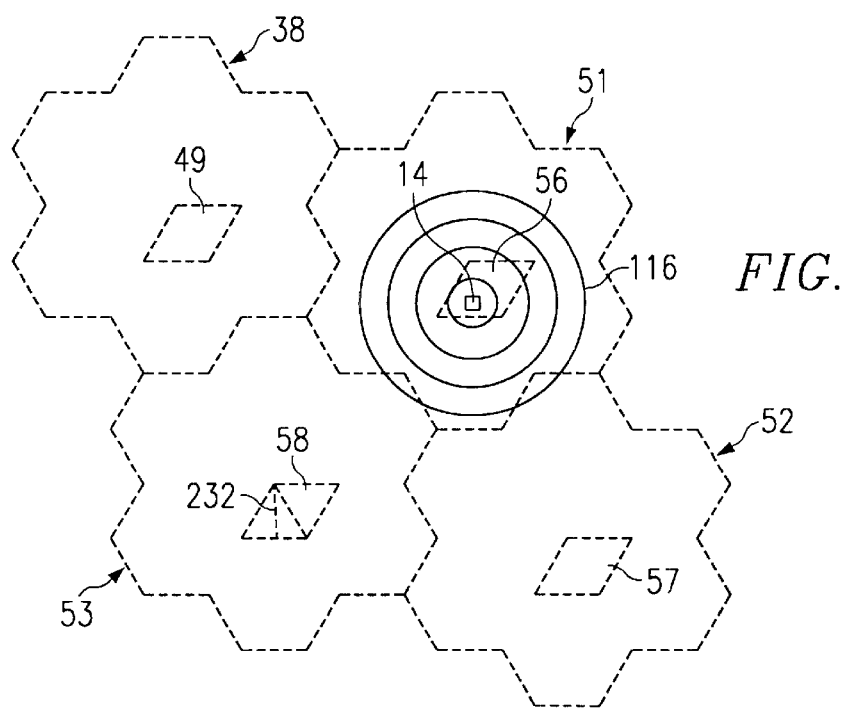
FIG. 8 is a diagrammatic top view similar to FIG. 4, but also showing the transmit pattern for a wireless telephone disposed in one of the cell groups.

As to interfering uplink signals, FIG. 8 is a view similar to FIG. 4, but showing the wireless telephone 14 disposed within the sector 56, and transmitting an omni-directional uplink signal represented diagrammatically by concentric circles 116. The telephone 14 transmits at a given power level, over which the network planner has little control. Further, since the signals transmitted by wireless telephones are omni-directional, the network planner has no control over the direction of transmission. This is different from base stations, where the network planner can vary a number of factors, including the direction and power level of transmitted signals.

This lack of control over the direction and power of uplink signals from telephones is one reason that network planners and existing NPTs have traditionally given minimal consideration to potential interference between uplink signals. It was assumed on the one hand that the power level at which wireless telephones transmit was high enough so that, if there was base station "coverage" which permitted the telephone to receive a downlink signal of adequate strength from the base station for the sector in which the telephone was located, the base station would inherently be able to receive the corresponding uplink signal transmitted by the telephone. It was also assumed that base stations using the same frequency sets were sufficiently far apart so that, when the uplink signal transmitted by a given telephone reached any other sector using the same frequency, the uplink signal would be sufficiently attenuated so that it was at least 21 dB below the signals of interest in that other sector, or completely below the minimum threshold.

In the early days of wireless telephones, the latter assumption was reasonably valid, because the distances between base stations were typically rather large. However, the physical distances between sectors which use the same frequencies are progressively decreasing, due to reduction in cell sizes and/or changes in frequency allocation configurations, for example as discussed above in association with the distances 61 and 91 in FIGS. 4 and 6. Consequently, and since the transmission power levels of most existing wireless telephones do not change, the attenuated power levels of uplink signals from most existing wireless telephones have become progressively higher in remote sectors as the distance has decreased between sectors using the same frequencies.

The foregoing discussion has mentioned various techniques that can be used by a network planner to improve coverage and/or to reduce interference. These techniques include adjustment of base station spacing, use of a different sector antenna with a different transmission pattern, adjustment of the transmission power at a given antenna, and/or adjustment of the height and angle of a given antenna. When a network planner has utilized these various techniques to the extent possible, and still has a problem, there is an additional approach which the network planner can use. More specifically, in place of a standard sector antenna of the type discussed above in association with FIG. 2, the network planner can use what is commonly known as a "smart" antenna. One type of smart antenna is known as a switched-beam antenna, and another type of smart antenna is known as an adaptive beam-forming antenna. Both types of antennas are known, but have not been widely used in wireless telephone networks, due at least in part to the lack of any cost-effective technique for analyzing their performance in a network.

Figure 9:
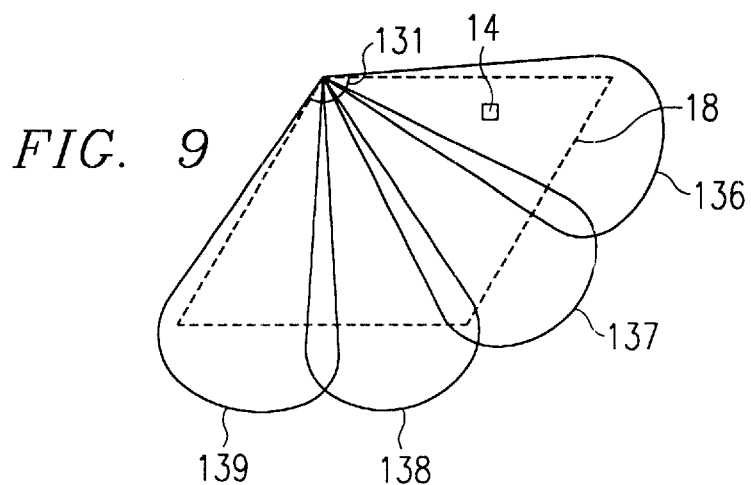
FIG. 9 is a diagrammatic top view similar to FIG. 2, but showing a switched-beam smart antenna and its multi-beam transmit pattern, and also showing a wireless telephone.

FIG. 9 is a diagrammatic top view similar to FIG. 2, but showing a switched-beam antenna 131 that transmits four beams 136–139 for the sector 18 in four respective directions. Although the switched-beam antenna 131 of FIG. 9 is depicted as having four beams 136–139, it will be recognized that a larger or smaller number of beams could be utilized. The subset of frequencies assigned to the sector are allocated among the four beams. Thus, in a 7/3 configuration, where 20 frequencies are allocated to the sector, 5 frequencies would typically be allocated to each of the beams 136–139. In a broad sense, the switched-beam antenna 131 is in some respects similar to four separate sector antennas of 30° each. However, there is a difference.

More specifically, and as discussed above with reference to FIG. 1, decisions are made at a network level regarding which sector a given telephone 14 is currently located in, and which frequency assigned to that sector should be used by the telephone 14 while it is in that sector. In contrast, the switched-beam antenna 131 is referred to as a "smart" antenna because it has the capability to make certain decisions of this type locally with its own control circuitry. In particular, the decision is still made at the network level regarding which sector a telephone is located in. However, once it is determined that the telephone is located in the sector 18 (FIG. 9), the switched-beam antenna 131 determines where the telephone is currently located in that sector. The switched-beam antenna 131 determines the location of the telephone within the sector 18 using known techniques, for example by filtering the signal from several antenna elements through a Butler matrix, and by making a decision as to which beam(s) have the strongest received signal strength.

Once the telephone has requested service, the switched-beam antenna assigns to the telephone a frequency which corresponds to one of the four beams 136–139, namely the beam within which the telephone's signal is currently located. This is the downlink frequency, at which the antenna will transmit to the telephone. If the telephone moves within the sector 18, for example from the beam 136 to the beam 137, the switched-beam antenna 131 detects this and instructs the telephone to switch from the current downlink frequency associated with beam 136 to a different downlink frequency associated with beam 137.

As noted above, frequencies are configured in pairs. Thus, when a downlink frequency is assigned by the switched-beam antenna in the manner just described, the corresponding uplink frequency of the pair will be automatically assigned at the same time. Further, if movement of the telephone within the sector leads to a change in the downlink frequency assignment, in the manner just described, an associated change in the uplink frequency will occur at the same time.

As discussed above, uplink signals are transmitted by wireless telephones with an omni-directional pattern. Nevertheless, a switched-beam smart antenna does have some capability to favor desired uplink signals over undesired (interfering) signals. More specifically, once the switched-beam antenna 131 has determined the approximate direction in which it is currently receiving signals from the wireless telephone 14, it can implement a directional receive function. In particular, it can process signals from its multiple antenna elements in a manner which effectively throws spatial nulls in directions other than the direction from which it expects to receive signals from the telephone 14. Consequently, if interfering signals are arriving from a different direction, they will be given less weight than would otherwise be the case.

The second type of smart antenna mentioned above is the adaptive beam-forming antenna. With respect to the reception of uplink signals, an adaptive beam-forming antenna has almost no repeatable pattern, because the receive pattern is continuously adjusted according to a complex "adaptive" algorithm of a known type, in a manner which optimizes the receive function so as to facilitate reception of uplink signals of interest, while rejecting undesired (interfering) signals. Due to the adaptive and changing characteristic of the receive pattern, there is no way to provide a meaningful drawing which shows a pattern of the type presented in FIGS. 2 and 9. A feature of the present invention is the provision of a simple but effective technique for modeling the ability of an adaptive beam-forming antenna to reject undesired signals, as described in more detail later.

Turning to the transmission of downlink signals, existing adaptive beam-forming antennas are capable of effecting adaptive control in the transmit function, by carrying over to the transmit function the current state of adaptive control developed for the receive function. However, this capability is typically not used in the wireless industry. This is because this capability is most effective for situations where transmission is occurring at the same frequency as reception (such as a TDD system), but most wireless networks use the two-frequency FDD approach. In particular, and as explained above, uplink and downlink signals in the typical wireless network are transmitted at different frequencies. Consequently, the state of adaptive control developed for receiving uplink frequencies may not be particularly meaningful if an attempt is made to carry it over to the entirely different frequencies involved in transmitting downlink signals. For example, multipath signals at the uplink frequency may tend to cancel each other at the antenna, whereas multipath signals at the downlink frequency have different wavelengths and may tend to reinforce rather than cancel each other. As a result, an adaptive beam-forming antenna in a wireless network is typically operated in an adaptive mode for purposes of receiving uplink signals, but for purposes of transmitting downlink signals it is operated in the same manner as a switched-beam antenna of the type shown at 131 in FIG. 9.

Figure 10:
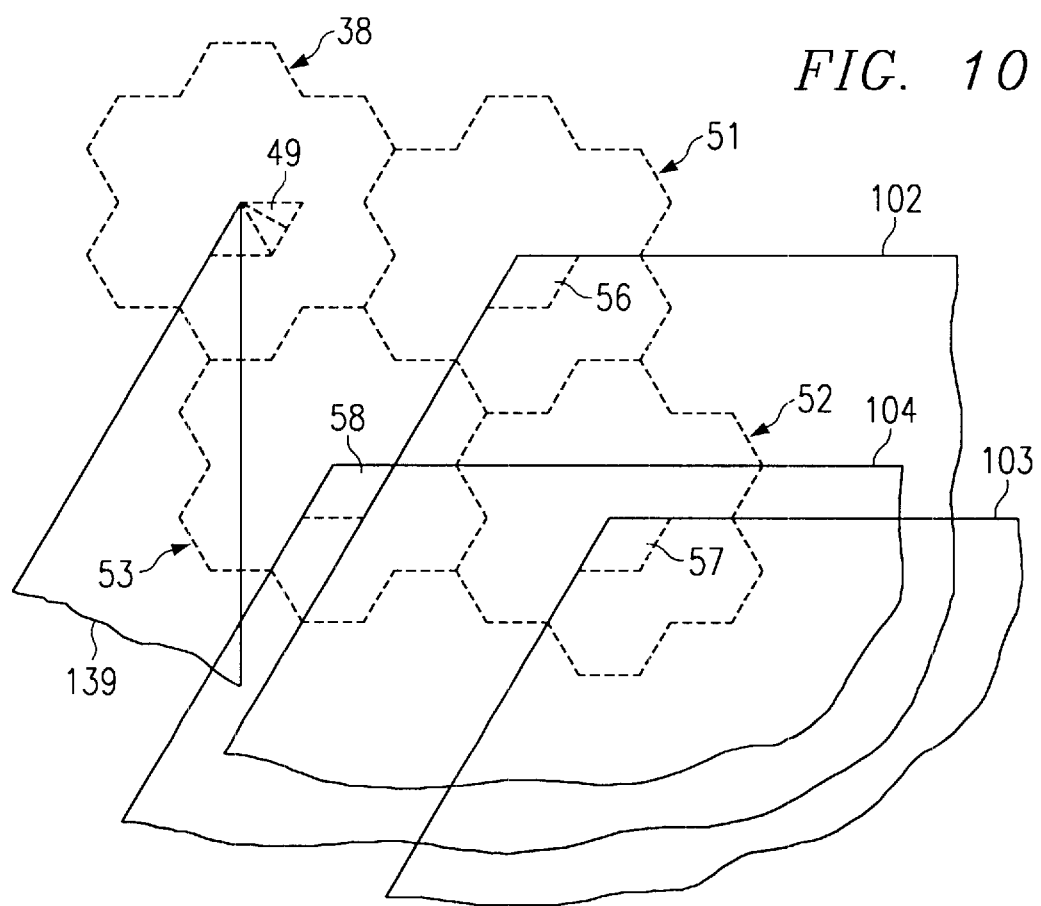
FIGS. 10–13 are each a diagrammatic top view similar to FIG. 4, but showing the transmit patterns for three standard sector antennas disposed in respective cell groups and the transmit pattern for a smart antenna disposed in a further cell group, each figure showing a respective different transmit beam of the smart antenna.

In order to provide a specific example of how a smart antenna can be advantageous in a wireless network, assume that the sector antenna used for the sector 49 in FIG. 7 is replaced with the switched-beam antenna shown at 131 in FIG. 9. The resulting network configuration is depicted in FIGS. 10–13. FIGS. 10–13 are similar to FIG. 7, but for clarity each depicts only a respective one of the beams 139-136 transmitted to the sector 49 by the switched-beam antenna 131. With reference to FIG. 10, it will be noted that, for the subset of frequencies associated with beam 139, there is no potential interference with any of the other illustrated sectors 56–58. In contrast, as shown in FIG. 7, the use of a sector antenna in sector 49 produced the beam 101, which created the potential for interference in each of the sectors 56–58.

Figure 11:
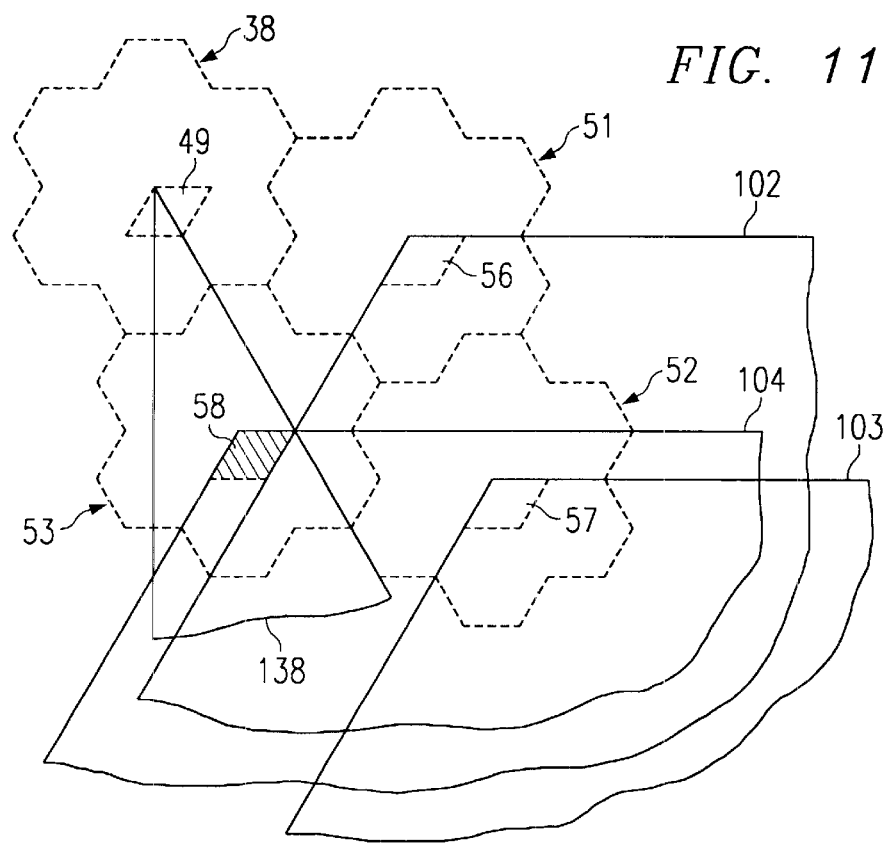
Figure 12:
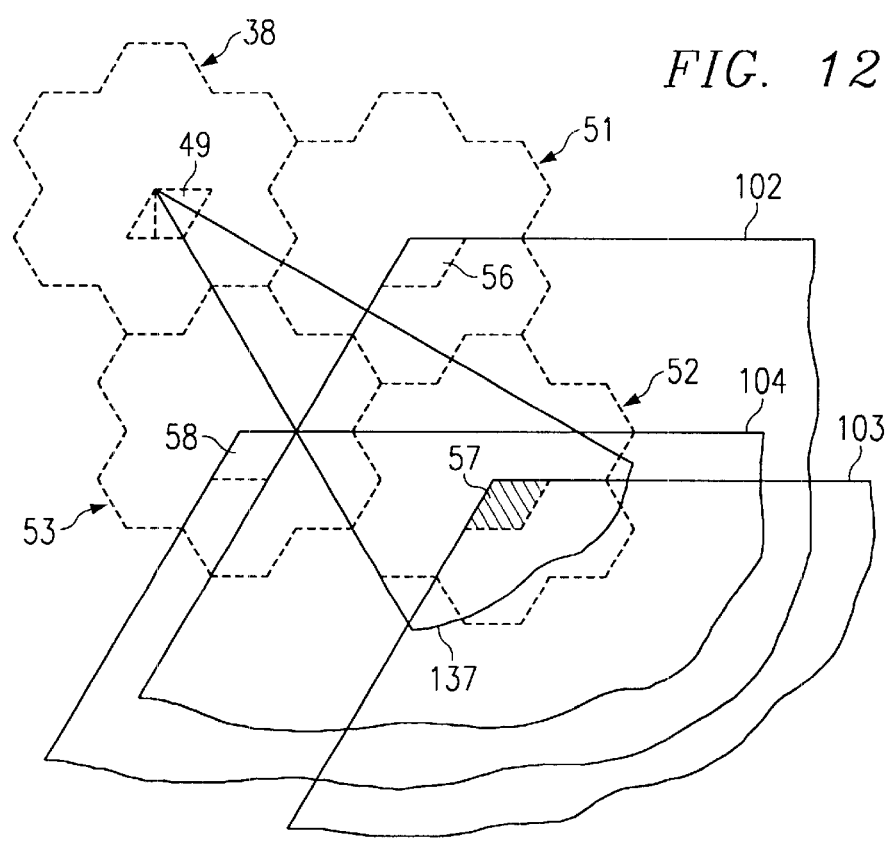
Figure 13:
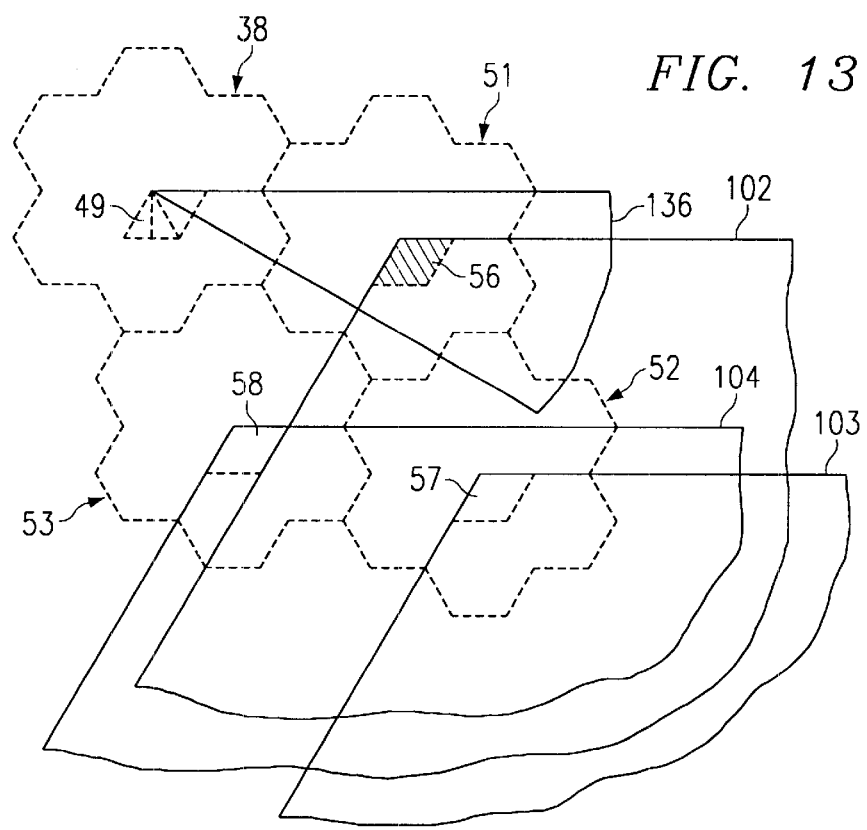

FIG. 11 shows that, for the frequency associated with beam 138, there is potential for interference in sector 58, but not in either of sectors 56 and 57. It will be recognized that this is also a significant improvement over the use of the sector antenna shown in FIG. 7, where potential interference existed in each of three sectors 56–58. Similarly, FIGS. 12 and 13 show the respective beams 137 and 136 which, like beam 138, each provide a potential for interference with only one other sector, namely a respective one of the sectors 57 or 56. Since the transmit power can be controlled independently for each of the four beams 136–139, there is a further capability to resolve a potential interference problem for a given beam by adjusting the transmit power for that particular beam.

Figure 14:
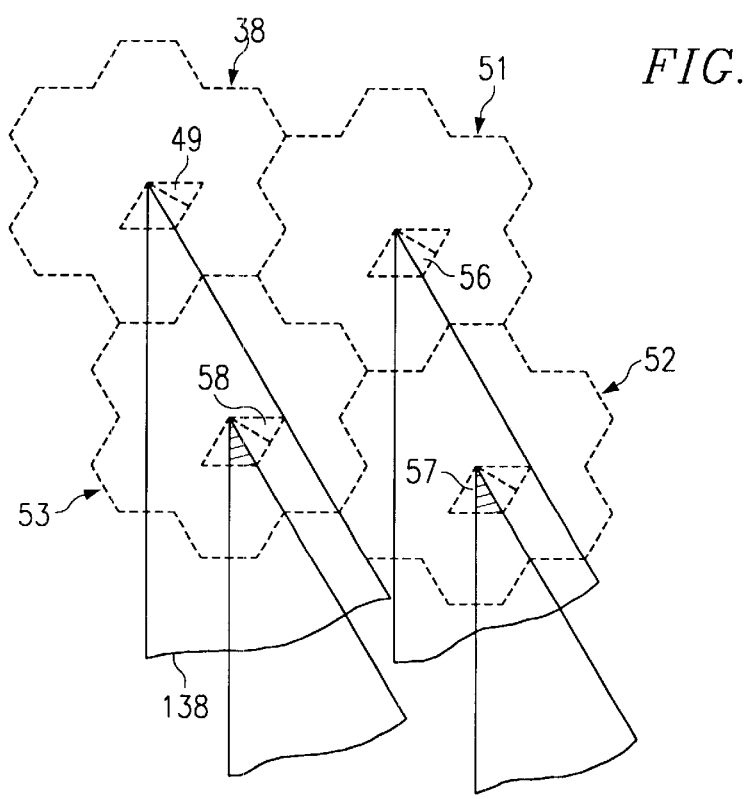
FIG. 14 is a diagrammatic top view similar to FIG. 4, but showing the transmit pattern for a single beam of each of several smart antennas, which are each disposed in a respective cell group.

A further consideration is that the situation progressively improves as progressively more switched-beam antennas are used. For example, FIG. 14 is a view similar to FIG. 11, except that the sector antennas in sectors 56–58 have each been replaced with a switched-beam antenna. It will be noted that the potential for interference has been further significantly reduced. For example, with reference to sector 58, the portion of sector 58 which may be subject to interference between local downlink transmissions and downlink transmissions on the beam 138 of sector 49 is only 25% of the area of sector 58, whereas the entire area of sector 58 was potentially subject to such interference in example of FIG. 11.

The foregoing discussion is directed to networks of the type to which planning techniques according to the present invention can be applied. The following discussion explains in detail how the planning techniques of the present invention are applied to networks of the type discussed above.

As discussed above in association with FIGS. 9–14, there are situations in which it can be advantageous to replace a standard sector antenna having a single fixed pattern beam with a smart antenna, such as a switched-beam antenna or an adaptive beam-forming antenna. It is recognized in the art that these advantages exist. However, existing NPT computer programs have no capability to model smart antennas. This is because, until recently, there was little need for smart antennas in wireless telephone networks, and no cost-effective way to plan their installation into practical networks. Thus, there was little need for techniques to model them. An interim solution was the use of newly-developed base stations of reduced power, commonly known as micro cells and pico cells, which provide coverage to high density user areas, for example inside buildings. However, techniques of this type, which facilitate capacity increase without use of smart antennas, are now reaching their deployment limits. The continued growth of the market for wireless communications is creating a progressively increasing need for smart antennas and techniques for modeling them. However, successful deployment of smart antennas into actual use will depend on the quality and capability of NPT computer programs, and how effectively and efficiently they model smart antenna technology. This is because network planners cannot readily incorporate smart antennas into existing and new networks without NPT programs that can accurately and efficiently model smart antennas.

With respect to techniques for modeling smart antennas, one pre-existing approach involves attempts to model radio frequency propagation of a smart antenna by Monte Carlo simulation and ray tracing. This is a time consuming and complex process when compared to the simple propagation models used for standard sector antennas in existing NPT computer programs. Monte Carlo simulation does not support the quick turnaround needed for actual use in planning real networks. One feature of the present invention is the provision of a technique for modeling a smart antenna in an NPT computer program, in a manner which is simple, straightforward and rapid, and which is also generally consistent with the configurations of existing NPT computer programs. In contrast, the use of Monte Carlo simulation would require a substantial restructuring of the approach used within existing NPT computer programs.

As mentioned above, the NPT industry has chosen four to six of the USGS predefined terrain types or "clutter models"

for use in estimating radio frequency signal attenuation across respective different terrain types. In particular, antenna manufacturers currently specify, for each passive antenna, information regarding the typical radio frequency signal attenuation which is likely to occur over azimuth and elevation patterns in both the vertical and horizontal planes with respect to signals transmitted by that antenna. NPTs then utilize these antenna patterns in combination with equations that model propagation loss of signals, which typically vary according to the type of terrain over which the signals pass. While the present invention is compatible with use of only four to six terrain types, the present invention contemplates that the number of terrain types would advantageously be expanded to about 22 to 25 terrain types. For these 22 to 25 terrain types, smart antenna manufacturers will provide information regarding the expected radio frequency signal amplification of the desired signal, and the attenuation of the undesired signal, across each of the various terrain types. The use of an increased number of terrain types provides finer gradations that will enable distinction between smart antennas, which can reveal performance differences when applied in different situations that differ in subtle respects. According to the invention, this smart antenna characterization information developed by the manufacturers will include a number for both the expected increase in signal strength (C) of desired signals and the expected decrease in signal strength (I) of undesired signals, specified in reference to a standard sector antenna for each terrain type.

In general, and as discussed above, when a network planner encounters a potential problem with coverage or interference, he or she will typically use standard adjustment techniques of the type discussed above in an attempt to eliminate the problem, before considering the use of a smart antenna. While it would be theoretically possible to lay out an entirely new network using only smart antennas, or predominately smart antennas, the most common situation is that the network planner is faced with an existing network in which an increase in call capacity is needed. After using all standard adjustment techniques, there may still be a small number of remaining localized problems which cannot be solved with standard techniques. At that point, the network planner will consider replacing one or more standard sector antennas with smart antennas on a one-by-one basis, in an attempt to eliminate these problems. Consequently, although the techniques of the present invention are entirely applicable to the design of a new network, the discussion which follows will be presented in the context of the more common situation in which a small number of smart antennas are being substituted on a one-by-one basis for standard sector antennas in an existing network. As one example, the standard sector antenna used for sector 49 in FIG. 7 might be replaced with a smart antenna, in order to obtain the modified network design discussed above in association with FIGS. 10–13.

Once a decision is made to introduce a smart antenna into a network, an evaluation is made as to which particular smart antenna should be used. In this regard, where the terrain type is a cluttered scenario such as the downtown area of a large city having tall buildings, certain types or models of smart antennas may perform significantly better than others. In contrast, where the terrain type is a rural setting which involves a flat prairie with no hills or trees, other types or models may perform better. Consequently, based on terrain type, and/or some other suitable factors, the network planner selects a smart antenna. This includes selection of not only a smart antenna type, such as a switched-beam antenna or an adaptive beam-forming antenna, but also a particular model of the selected type, for example one of several models of switched-beam antennas, or one of several models of adaptive beam-forming antennas.

An NPT computer program which embodies the present invention can include support for selection of the type and model of smart antenna by the network planner. For example, given one or more selection criteria, the NPT program may generate and display a list which ranks available smart antennas on the basis of terrain type and/or other selection criteria.

Figure 15A:
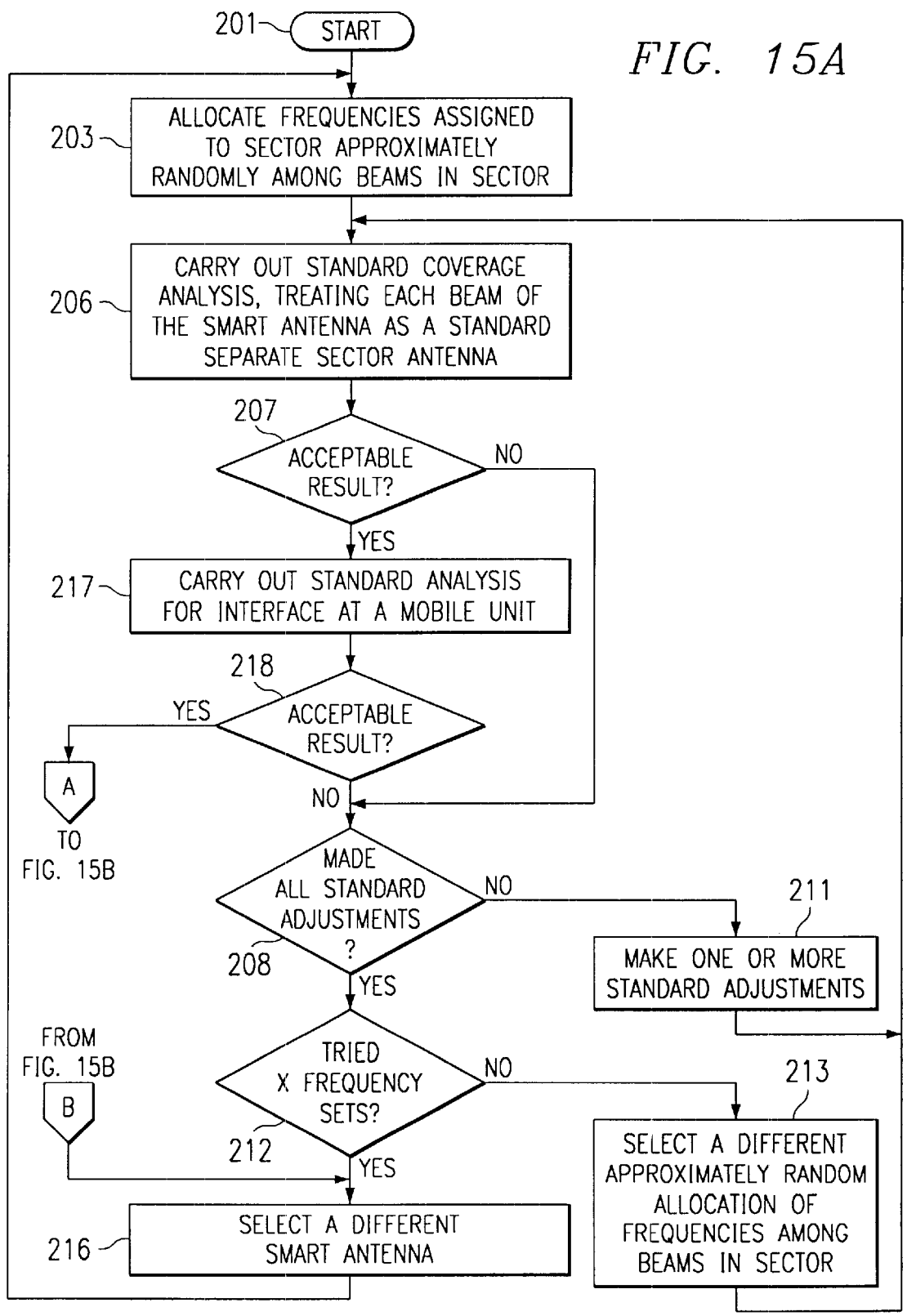
FIG. 15 is a flowchart showing a sequence of operations in a technique which embodies the present invention, and which can applied to networks of the type shown in FIGS. 1–14.
Figure 15B:
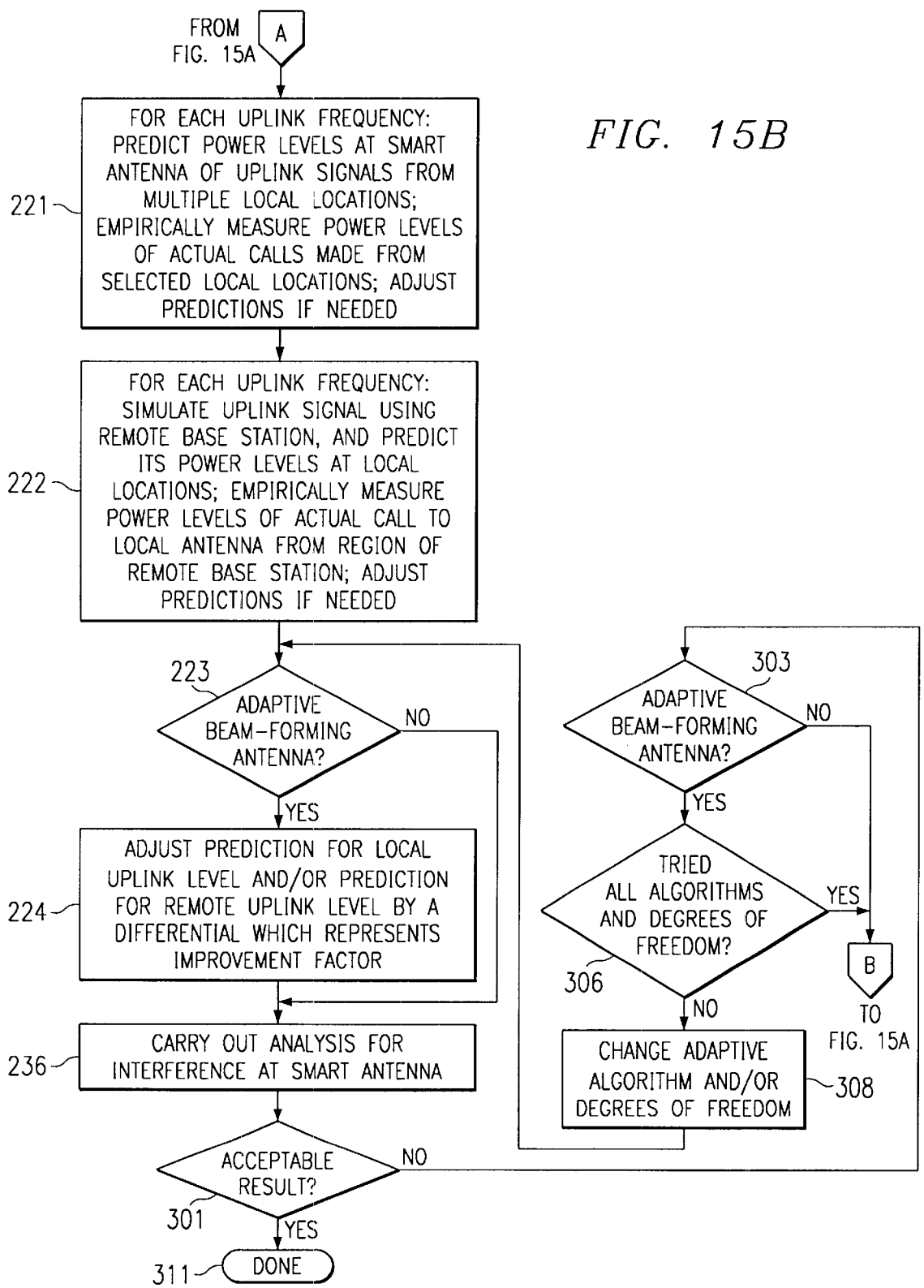

Once a particular type and model of smart antenna has been selected, the NPT computer program carries out coverage and interference analysis in a manner which embodies features of the invention. In this regard, FIG. 15 is a flowchart showing one possible way in which this might be implemented. More specifically, following selection of a type and model of smart antenna, control will proceed through block 201 to block 203. In block 203, the NPT program will take the set of frequencies which are assigned to the sector having the smart antenna, and will allocate those frequencies approximately randomly among the beams in the sector. In essence, this constitutes allocation among the beams of the downlink frequencies used for transmission. Ideally, this would be a true random allocation. As a practical matter, however, a computer program would typically use a pseudo-random technique to approximate true randomness. For example, allocation might be performed by generating a pseudo-random number sequence, and then using it to dynamically assign the available frequencies among the beams during actual execution of the NPT program. Alternatively, several predefined frequency allocations could be prepared using either random or approximately random allocation, and then stored in the NPT program. One of these predetermined allocations could then be selected in block 203 during execution of the NPT program, using some form of approximately random selection technique.

As one specific example of how this frequency allocation might be effected, assume that the cell 12 of FIG. 1, which is part of a 7/3 configuration, is assigned 60 frequencies, which for convenience are arbitrarily identified with successive numbers 1–60. Referring to TABLE 1, the left column identifies the three sectors 48–50 which are present in the cell 41 of FIG. 3. Assume that the second column of TABLE 1 shows the manner in which the 60 frequencies assigned to cell 41 have been allocated among the three sectors 48–50 by the service provider. Of course, there are a variety of possible allocations among the sectors, and the second column of TABLE 1 is thus just one possible example.

Assume that the sector antenna used in sector 48 is replaced with a smart antenna having four beams, which are arbitrarily identified as beams B1–B4 in the third column of TABLE 1. The four top rows in the right column of TABLE 1 show how the frequencies identified for sector 48 in the second column might be approximately randomly allocated in block 203 among the four beams of the smart antenna used in sector 48. Alternatively, assume that instead of replacing the sector antenna in sector 48 with a smart antenna, the sector antenna in sector 49 is replaced with a smart antenna, which has four beams arbitrarily identified as beams B5–B8 in the third column of TABLE 1. The four middle rows in the right column of TABLE 1 show how the frequencies identified in the second column for sector 49 might be approximately randomly allocated in block 203 among the four beams B5–B8.

TABLE 1

| Sector | Frequencies | Beam | Frequency Allocation |
|---|---|---|---|
| 48 | 1, 5, 6, 11, 13, 14, | B1 | 1, 13, 24, 32, 54 |
|  | 18, 22, 24, 26, 32, 33, | B2 | 5, 22, 40, 49, 56 |
|  | 38, 40, 41, 49, 50, 54, | B3 | 11, 14, 26, 38, 50 |
|  | 55, 56 | B4 | 6, 18, 33, 41, 55 |
| 49 | 2, 3, 7, 12, 15, 21, | B5 | 2, 21, 28, 39, 51 |
|  | 23, 25, 27, 28, 31, 37, | B6 | 12, 23, 27, 37, 44 |
|  | 39, 42, 44, 46, 48, 51, | B7 | 3, 25, 42, 46, 60 |
|  | 57, 60 | B8 | 7, 15, 31, 48, 57 |
| 50 | 4, 8, 9, 10, 16, 17, | B9 | 9, 16, 35, 43, 45 |
|  | 19, 20, 29, 30, 34, 35, | B10 | 4, 20, 29, 53, 59 |
|  | 36, 43, 45, 47, 52, 53, | B11 | 8, 17, 34, 36, 47 |
|  | 58, 59 | B12 | 10, 19, 30, 52, 58 |

In a similar manner, the four bottom rows of the right column of TABLE 1 show how the frequencies for sector 50 might be randomly allocated among four beams B9–B12, in the event that the smart antenna was selected for use in sector 50. These three examples of approximately random allocations, which are shown in the top four rows, middle four rows and bottom four rows of the right column of TABLE 1, are merely examples. There are a variety of other approximately random allocations which could alternatively be used.

It will be recognized from the foregoing discussion that the approximately random allocation of frequencies which is carried out in block 203 is carried out at the sector level, and not at the cell level. This approximately random allocation of frequencies to different beams within the sector for purposes of modeling is intended to approximate the randomness of the location of a user of a wireless telephone within the sector, and also to provide a good basis for estimating potential interference conditions within the network, without using complex and time-consuming Monte Carlo simulation.

After the approximately random frequency allocation has been completed in block 203, control proceeds to block 206, where the NPT program carries out a standard coverage analysis of the type discussed above, where each beam of the smart antenna is treated as if it is generated by a separate standard sector antenna. As evident from the foregoing discussion, this coverage analysis is carried out as to the coverage provided by the antenna with respect to the downlink signals that it transmits, rather than with respect to the coverage of uplink signals transmitted to the antenna by mobile telephones. The coverage analysis is carried out separately for each of a number of different frequencies at which the selected smart antenna will operate.

Control then proceeds to block 207, where a decision is made as to whether the result of the coverage analysis is acceptable. If not, then control proceeds to block 208, where a decision is made as to whether all standard adjustment techniques of the type discussed above have been exhausted. If not, then control proceeds to block 211, where standard adjustment techniques are used in an attempt to eliminate coverage problems. Then control returns to block 206 to carry out the coverage analysis again so as to take into account the adjustments which have been made.

Focusing again on block 208, if it is determined that all standard adjustment techniques have been tried, then control proceeds to block 212, where a determination is made as to whether a predetermined number ("X") of sets of substantially randomly allocated frequencies have been tried with the currently selected smart antenna. If not, then control proceeds to block 213, where a different approximately random set of frequencies is selected, and then control returns to block 206 to repeat the coverage analysis using the new frequency set. On the other hand, if it is determined at block 212 that X different frequency sets have already been tried with the currently selected antenna, then control proceeds to block 216, where a different smart antenna is selected. Control then proceeds to block 203, where the entire analysis starts over using the newly selected smart antenna.

Focusing again on block 207, if it was determined that the result of the coverage analysis in block 206 was acceptable, then control would have proceeded to block 217. In block 217, the NPT program carries out a standard interference analysis of the type discussed above. This is an analysis of the extent to which downlink transmissions from the selected smart antenna and from other antennas at a given frequency may tend to cause interference at a wireless telephone. This analysis is carried out separately for each of a number of different frequencies at which the selected smart antenna will operate. Moreover, this multiple-frequency analysis is carried out separately for each antenna in the system which may transmit a signal that can potentially interfere with signals transmitted by the selected smart antenna. Control then proceeds to block 218, where a determination is made as to whether the results of this interference analysis are acceptable. If not then control proceeds to block 208, which has already been discussed. Alternatively, if the results are acceptable, then control proceeds to block 221.

Block 221 is the first in a sequence of blocks will carry out a further interference analysis, involving the extent to which uplink signals transmitted by different wireless telephones may tend to cause interference at the selected smart antenna. This analysis is carried out separately for each of a number of different frequencies at which the selected smart antenna will operate, and for each of a number of different remote sectors from which interfering signals could be transmitted by a wireless telephone.

In more detail, and as discussed above, existing NPT computer programs typically carry out coverage and interference analysis only with respect to the downlink signals transmitted by base stations. As to coverage, this is based partly on the assumption that, if a base station antenna provides suitable downlink coverage in its sector, such that a wireless telephone within that sector will receive a suitably strong downlink signal above the minimum threshold, then reciprocal uplink coverage will also inherently be present, in that the uplink signal transmitted by the telephone will be suitably strong when it reaches that base station. Since the trend is toward cells of reduced size, this assumption regarding coverage remains reasonable.

With respect to interference, on the other hand, the potential for interference of downlink signals at a telephone has traditionally been analyzed, but the potential for interference of uplink signals at a base station has been de-emphasized. This is based in part on the assumption that the omni-directional uplink signal transmitted by a wireless telephone will be substantially attenuated by the time it reaches remote sectors that may be using the same frequency, to the point where it is so weak that it is below the minimum threshold and thus does not present a potential interference problem. However, as discussed above, the trend in network design is toward cells of smaller sizes and/or use of different frequency allocation configurations, all of which tend to decrease the effective distance between sectors which use the same set of frequencies. Consequently, there is an increasing likelihood that, when the uplink signal transmitted by a wireless telephone reaches a remote sector, it will have a power level which is above the minimum threshold and thus can present a problem of potential interference.

Therefore, a feature of the present invention is the provision of a technique to evaluate potential interference which might occur at a base station due to uplink signals transmitted by two different wireless telephones located in respective sectors. The following explanation of this type of interference analysis is presented in the specific context of smart antennas. However, it should be kept in mind that this procedure for uplink interference analysis is not restricted to use with smart antennas.

As to carrying out an interference analysis with respect to uplink signals, one conceptual hurdle is the fact that a wireless telephone is a mobile device, and thus might be present anywhere within the sector in which it is currently disposed. Nevertheless, an uplink interference analysis technique according to the present invention provides a reasonable approximation of the effect that the uplink signal transmitted by such a telephone might have in a remote sector. In order to explain this technique in the context of a specific example, reference is made to FIG. 8. In particular, assume for the sake of example that the specific analysis of interest is the extent to which a smart antenna serving sector 58 might be subject to interference between an uplink signal transmitted by a not-illustrated wireless telephone in the local sector 58, and the uplink signal transmitted by the wireless telephone 14 in the remote sector 56, or by a similar wireless telephone in either of the remote sectors 49 or 57.

In general, the approach according to the invention makes the assumption that each wireless telephone in a remote sector is, at any instantaneous point in time, as likely to be adjacent the base station in that sector as at any other location in that sector. Based on this assumption, the invention provides for the NPT program to simulate each such remote wireless telephone by using its associated base station, in particular by analyzing the effect of the remote base station at a local base station of interest, while simulating operation of the remote base station at a reduced power level. In order for the NPT program to accurately do this, techniques are used which involve predictions and/or empirical measurements. Although it would be possible to use only predictions or only empirical measurements, known prediction techniques have a limited degree of accuracy in comparison to the above-mentioned differential of 21 dB, whereas empirical measurements become cumbersome when they are needed at a large number of different locations. Consequently, the disclosed embodiment uses a combination of these techniques. The manner in which these techniques are carried out will now be explained.

In more detail, with reference to block 221 of FIG. 15, each uplink frequency of interest is handled in the following manner. Calculations are carried out to predict the power levels that the smart antenna would expect to see from uplink signals transmitted at an uplink frequency by a mobile telephone when it was at each of a plurality of different locations within the local sector 58 served by the smart antenna. In this regard, existing NPTs have a path loss prediction routine which can predict the expected loss in signal strength of a downlink signal transmitted by an antenna to any location in the sector it serves, taking into account the particular terrain type across which the signal propagates. The present invention assumes that, for a given location within the sector, the degree of attenuation experienced by an uplink signal transmitted from that location to the antenna will be the same as the degree of attenuation experienced by a downlink signal transmitted from the antenna to that location.

Therefore, according to the invention, a separate calculation is carried out for each of a plurality of different locations scattered throughout the local sector served by the smart antenna. This calculation involves using the path loss prediction routine in the NPT to predict the expected attenuation factor for a downlink signal transmitted from the antenna to the respective location of interest across the applicable terrain type. Then, to calculate the power level seen by the antenna for an uplink signal from a mobile telephone at the particular location within the sector, the transmission power level typical of a mobile telephone is reduced by the same attenuation factor calculated at the location of interest for a downlink signal, and then is saved for later use.

Next, these calculated values are empirically verified, and adjusted if necessary. In this regard, there are special existing mobile telephones which are designed for use by service providers, and which can place a telephone call at a selected frequency to any selected base station within radio range of the telephone. The user of such a telephone can thus specify that his or her call is to be placed to a selected remote base station, rather than to a closer base station to which the network would otherwise assign the call. This special telephone also has the capability to trigger measurements of the signal strengths at the telephone and at the base station of the uplink signal transmitted from the telephone to the base station.

With reference to the example of FIG. 8, a person would take this special telephone to several of the locations within the local sector 58, and then place from each such location an actual telephone call to the actual existing antenna for the sector 58 (which may not yet actually be a smart antenna). A measurement is made of the power level of the uplink signal at the telephone, and at the antenna receiving that signal. This information is fed into the NPT program.

Then, for each location in the local sector at which such an actual empirical measurement was made, the NPT program uses the empirical information from each call to determine the actual attenuation in signal power that was experienced by the actual uplink signal. This is then compared to the predicted attenuation for an uplink signal transmitted at the frequency of interest from that particular location. If the actual measured values do not agree with the calculated values, then the calculated values for all of the locations within that local sector are modified, using interpolation to make adjustments for the locations at which actual measurements were not taken.

Control then proceeds from block 221 to block 222. At block 222, for each of the locations within the local sector 58, calculations are carried out to predict a further value. This further value is a representation of the power level that would be seen by a smart antenna serving sector 58 with respect to uplink signals transmitted at the frequency of interest by a mobile telephone in a remote sector, such as one of the sectors 49, 56 or 57. According to the invention, this is carried out by adjusting the definition in the NPT of the base station in the remote sector, so that it simulates a mobile telephone. In particular, the defined height of the antenna at the remote base station is reduced to roughly four feet, the defined transmit pattern for that antenna is changed to be omni-directional, and the defined transmit power level for that antenna is re-defined to have approximately the same strength as a typical mobile telephone. Then, the path loss prediction routine is used to calculate the attenuated power level which this signal would be expected to have at each of the different locations mentioned above that are within the sector served by the smart antenna. Each of these calculated values is saved for later use.

Thus, for each of the indicated locations within the local sector that would be served by the smart antenna, there are two stored values. One of these two stored values represents the power level that would be seen at the smart antenna for an uplink signal transmitted by a mobile telephone disposed at that location within the local sector. This stored value is based on a predicted values, possibly with empirical adjustment, as has already been described above in association with block 221. The other of the two values represents the calculated or predicted power level at that location for an uplink signal transmitted by a mobile telephone disposed in a remote sector. This latter value is then adjusted, if appropriate, based on further empirical measurement.

More specifically, for each frequency of interest, the special telephone discussed above is used to make an actual telephone call to the base station for the local sector 58, from a location adjacent the remote base station of interest. The remote base station might be that associated with one of the sectors 49, 56 or 57. The actual power levels of the uplink signal are measured at the telephone and at the local antenna for sector 58, so that an actual attenuation factor can be determined by taking the ratio of these measured power levels. This actual attenuation factor is then compared to the calculated degree of attenuation from the remote base station to one of the locations within the local sector which is close to the antenna for the local sector. If the actual measured values do not agree with the calculated values, then the calculated values for all of the locations within that local sector are modified, using interpolation where appropriate.

Control then proceeds to block 223 in FIG. 15, where a determination is made of whether the selected smart antenna under analysis is an adaptive beam-forming antenna. If it is, then a further adjustment is made at block 224. Alternatively, if the antenna is a switched-beam antenna, block 224 is skipped and the further adjustment is not made. This additional adjustment reflects the fact that, for receiving uplink signals, the adaptive algorithm used by an adaptive beam-forming antenna provides a more sophisticated level of rejection of unwanted signals than the rejection capability of the receive function of a switched-beam smart antenna.

In block 224, the NPT computer program makes some adjustments to the values representing signal strengths at certain locations within the network, before an interference analysis is carried out for uplink signals as to an adaptive beam-forming antenna. In this regard, manufacturers of adaptive beam-forming antennas specify for each of several predefined terrain types at least one improvement value, which is based on data empirically measured by the manufacturer using the antenna, and which represents the average expected improvement that will result from replacing a standard sector antenna with that adaptive beam-forming antenna in the specified terrain type. For purposes of the present example, assume that the adaptive beam-forming antenna introduced into sector 58 has a manufacturer specified improvement value of 10 dB for the terrain type which is present in sector 58. According to the present invention, block 224 of FIG. 15 calls for adjustment by the NPT program of one or both of the two values associated with each of the above-mentioned locations in sector 58. For each such location, one of these values is the value for that location as determined above in association with block 221, and the other is the value as determined in association with block 222. The adjustment involves changing one or both values so as to increase the difference between them by the improvement value of 10 dB.

Figure 16:
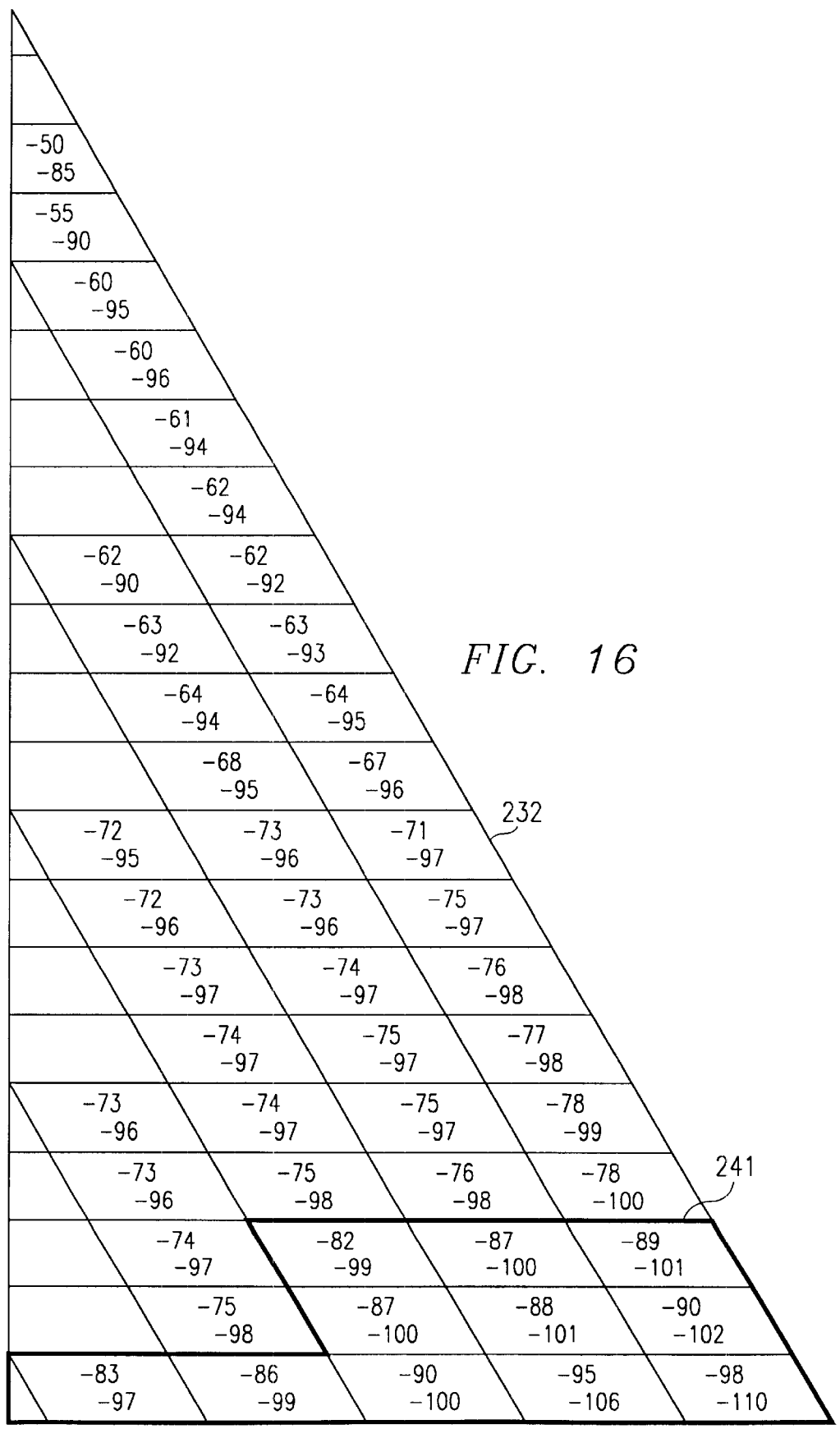
FIGS. 16 and 17 are each a diagrammatic view of a portion of a sector in a wireless network, showing various numbers calculated by a network planning computer program which embodies the invention, in order to facilitate the use of a smart antenna in the network.

This adjustment is explained in more detail with reference to FIGS. 16–17. More specifically, FIG. 16 is a diagrammatic view of a one-fourth portion 232 (FIG. 8) of the sector 58. The discussion which follows is applicable to the entire sector 58, but for convenience and clarity only the one-fourth portion 232 of this sector is shown in FIG. 16. The NPT computer program subdivides each sector within the network into a grid of subsectors. FIG. 16 shows within the portion 232 a grid of parallelograms, which each represent a respective one of the subsectors. The size of the subsectors could arbitrarily be larger or smaller than that shown in FIG. 16, such that there are a larger or smaller number of subsectors within each sector.

Each of the subsectors shown in FIG. 16 corresponds to a respective one of the locations in sector 58 that were discussed above in association with blocks 221 and 222. Further, each of the subsectors in FIG. 16 have two numbers therein. One represents the value determined for that subsector or location in the manner discussed above in association with block 221, and the other number represents the value determined for that subsector or location in the manner discussed above in association with block 222. In FIG. 16, each of the two numbers in each subsector represents a signal strength in dB per milliwatt.

The numbers in the subsectors of FIG. 16 are expressed in relation to a fixed reference, which is relatively large in comparison to the signal strengths. Consequently, the numbers are negative values, where signal strength is greater for numbers closer to zero. For example, a value of −76 represents a stronger signal than a value of −98. The upper number in each subsector represents the signal strength which would be seen at an antenna serving sector 58 based on an uplink signal transmitted by a wireless telephone disposed within that subsector of sector 58. The lower number in each subsector represents the signal strength which would be experienced in that subsector for an uplink signal transmitted from a remote sector, such as one of the sectors 49, 56 or 57, and as described above in association with block 222. For purposes of this discussion, it is assumed that all of the numbers in FIG. 16 represent signal strengths above the minimum threshold. In the actual NPT program, every subsector would have two such numbers associated with it. In FIG. 16, only an exemplary subset of these numbers are depicted, to the extent needed to facilitate an understanding of the present invention.

As discussed above, if the selected smart antenna is an adaptive beam-forming antenna, an adjustment is made to the values determined in blocks 221 and 222. In this regard, and as discussed above, manufacturers of adaptive beam-forming antennas specify for each of several predefined terrain types at least one improvement value, which is based on data empirically measured by the manufacturer using the antenna, and which represents the average expected improvement that will result from replacing a standard sector antenna with an adaptive beam-forming antenna in the specified terrain type. As noted above, it is assumed for purposes of the present example that the adaptive beam-forming antenna introduced into sector 58 has a manufacturer specified improvement value of 10 dB for the terrain type which is present in sector 58. According to the present invention, in block 224 in FIG. 15, the NPT program adjusts one or both of the values for every subsector in sector 58, including each of the subsectors shown in FIG. 16, so as to increase the difference between the values by the improvement value of 10 dB.

With reference to FIG. 16, this adjustment can be effected by changing only the bottom number (by decreasing it by the full improvement value to obtain a more negative value), changing only the top number (by increasing it by the full improvement value to obtain a less negative value), or by changing both numbers (by decreasing the bottom number and increasing the top number by respective values which add up to the full improvement value). As to the latter, the NPT program may split a single improvement value into two portions, or the manufacturer may specify the improvement value as two portions. Since governmental regulations often dictate maximum signal power within a service area, rather than interference levels, taking the approach of changing only the bottom number would be a safe approach for purposes of maintaining compliance with governmental regulations. Aside from this, either of the three indicated approaches is satisfactory for purposes of the present invention.

In order to facilitate the clearest possible understanding of the present invention, the present discussion explains the approach of changing both numbers. More specifically, assume that the NPT program makes the differential adjustment to the numbers in the subsectors of FIG. 16 by increasing each top number by 3 dB, and decreasing each bottom number by 7 dB, where 3 dB and 7 dB add up to the above-mentioned differential improvement value of 10 dB. This results in the revised numerical values which are shown in FIG. 17. Stated differently, FIG. 16 represents the values which were determined in blocks 221–222 and which will be used for interference analysis with respect to an antenna other than an adaptive beam-forming antenna, such as a switched-beam smart antenna. In contrast, FIG. 17 represents the values that will be used for interference analysis with respect to an adaptive beam-forming antenna.

Whether or not control in FIG. 15 passes through or skips block 224, it will ultimately reach block 236. In block 236, an interference analysis is carried out to determine which subsectors within the sector 58 have a differential of less than 21 dB between the two values associated with that subsector. In this regard, and as discussed earlier, a desired signal must generally have a signal strength 21 dB higher than an undesired or interfering signal, in order to permit the former to be accepted and the latter to be rejected. Consequently, in each of the subsectors throughout the sector 58, including those shown in FIG. 16, the NPT program makes a determination of whether the top number in each sector is 21 dB higher than the bottom number. If a differential of at least 21 dB exists in each subsector within sector 58, then there is no interference problem to address.

Figure 17:
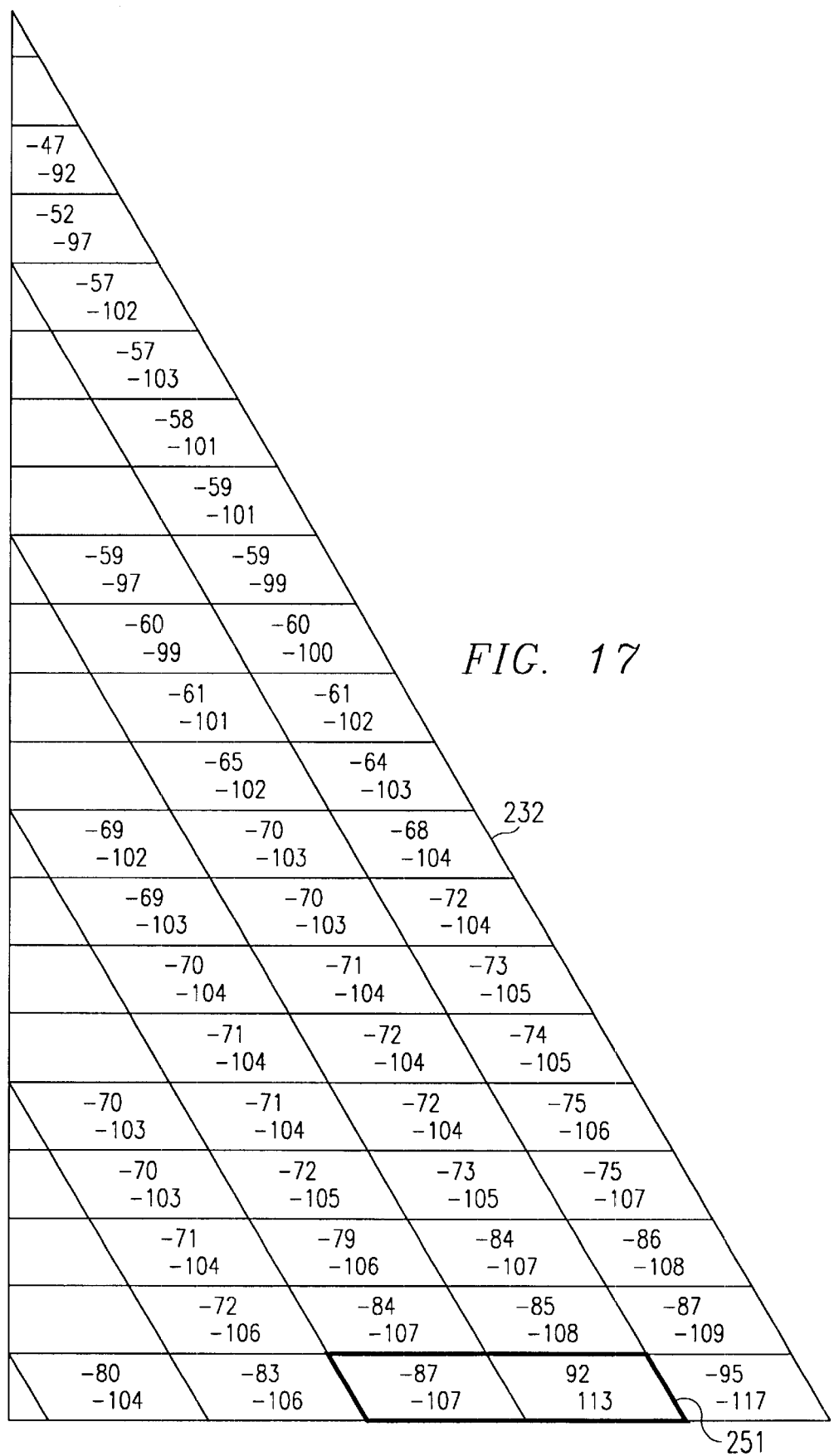

In order to present this in the context of the specific example which is being described here in association with FIGS. 16–17, assume initially that the selected smart antenna is a switched-beam antenna. This means that the values depicted in FIG. 16 will be used for the interference analysis. The subsectors in FIG. 16 which will be found to have potential interference problems are those within the boundary 241 in FIG. 16.

On the other hand, if it is assumed that the selected smart antenna is an adaptive beam-forming antenna, then the values depicted in FIG. 17 will be used for the interference analysis. In FIG. 17, only the subsectors within the boundary 251 will be found to have potential interference problems. Thus, comparing the area within boundary 241 in FIG. 16 to the area within boundary 251 in FIG. 17, the smaller area in FIG. 17 is a representation of the greater ability of an adaptive beam-forming antenna to reject unwanted signals. This results from the fact that the adaptive beam-forming smart antenna has the capability to adaptively vary its receive operation, whereas the switched-beam smart antenna does not. For each remote sector of interest, such as the sectors 49, 56 and 57, and for each uplink frequency of interest, a separate interference analysis of the type just described is carried out.

From block 236, control proceeds to block 301, where a determination is made as to whether the result of the uplink signal interference analysis (as to all remote sectors and uplink frequencies) represents an acceptable situation. In this regard, a feature of existing smart antennas is the ability to intelligently reject signals from a limited number of other interfering sources. The details of this capability are known in the art, and are outlined only briefly here. In general, the number of interfering signals that a particular smart antenna can reject are a function of the design of the antenna sensor array, in combination with algorithm control details.

In more detail, the ability of an adaptive beam-forming antenna to reject interfering signals is basically dependent on the number of antenna elements. An adaptive beam-forming antenna with N elements typically possesses N−1 degrees of freedom, permitting it to track and reject up to N−1 undesired signals. Switched-beam antennas also have a degree of capability to reject interfering signals. In the case of a switched-beam antenna, this capability and the limitations on it center around the number of beams, the isolation between the beams, and user traffic patterns. The manufacturer of a smart antenna provides information regarding the capability of that antenna to reject undesired signals which would otherwise create interference.

In the case of both types of smart antennas, the NPT computer program can be provided with the manufacturer-supplied information regarding the capability of each type of antenna to reject undesired signals. This would include rejection capability information for each of the 22 to 25 different possible combinations of terrain and building type that form the suite of performance capabilities for that smart antenna system (where the term system includes both the antenna elements and the particular algorithm in use). Then, as the NPT program evaluates the extent of potential uplink signal interference problems at block 301 in FIG. 15, the NPT program can automatically ignore interfering sources, up to the specified limit for that smart antenna. For example, if a given smart antenna was capable of rejecting up to four interfering signals, then at block 301 the NPT program could automatically ignore potential interfering sources with respect to that smart antenna, until the total number of interfering sources was five or more, at which point the NPT program would notify the network planner that the maximum capacity of the antenna to reject interference had been exceeded.

In this regard, if the NPT program was printing a plot of interference conditions, it might show the sector for the smart antenna in one color if there were no potential for interfering uplink signals, in a second color if the number of interfering uplink signals was less than the maximum capacity for rejection, and in a third color if the number of interfering uplink signals was in excess of the maximum capacity for rejection. Moreover, these colors used for smart antennas might be entirely different from the colors used for other types of antennas, in order to give the network planner an indication of where it might be possible to add more frequencies in surrounding areas, given that the smart antenna would be in place to provide compensation for the extra interference conditions that might result from the addition of capacity.

In FIG. 15, if it is determined at block 301 that the result of the interference analysis is not acceptable, then control proceeds to block 303, where the system checks to see whether the tentatively selected smart antenna is an adaptive beam-forming antenna. If not, then control proceeds back to block 216, where a different smart antenna is selected for analysis. Otherwise, control proceeds from block 303 to block 306, where a determination is made as to whether all available adaptive algorithms and/or all available degrees of freedom have been analyzed for the currently selected smart antenna. If not, then control proceeds to block 308, where a different adaptive algorithm and/or different degree of freedom is selected, and then control proceeds back to block 223 for further analysis. On the other hand, if it was determined at block 306 that all algorithms and/or degrees of freedom had already been analyzed for the currently selected smart antenna, then control would proceed back to block 216 for selection of a different smart antenna. Returning again to block 301, if it was determined here that the result of the interference analysis was acceptable, then control would have proceeded to block 311, representing the end of the depicted procedure.

Figure 18:
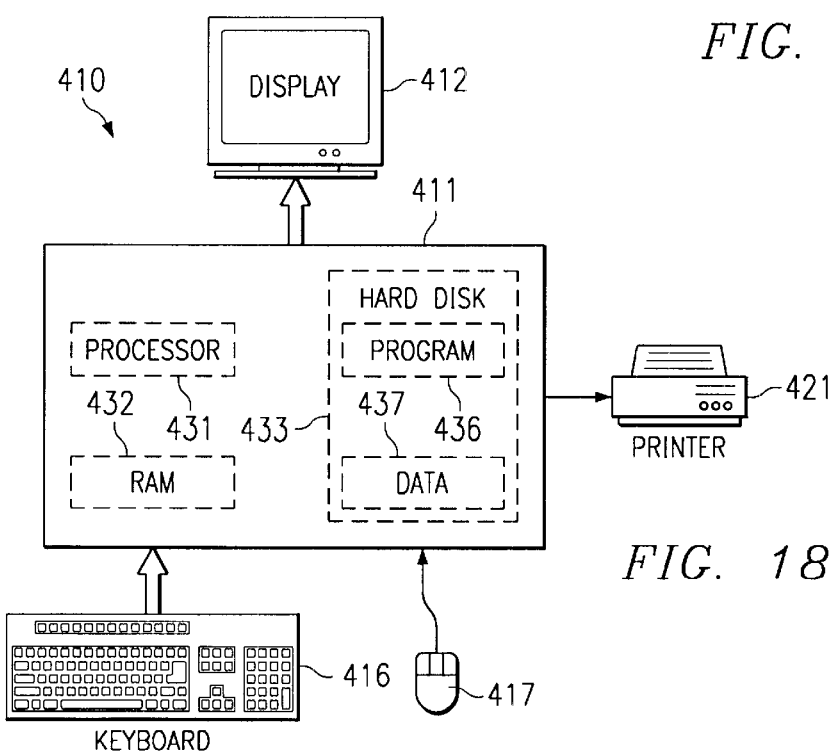
FIG. 18 is a diagrammatic view of a computer system which runs a network planning computer program that embodies features of the present invention.

FIG. 18 is a diagrammatic view of a computer system 410 which runs the NPT program that embodies the features of the present invention. The hardware of the system 410 can be a commercially available system of the type commonly known as a personal computer or workstation. The system 410 includes a system unit 411, a cathode ray tube (CRT) display 412, a keyboard 416, a pointing device such as a mouse 417, and a printer 421. The printer 421 could alternatively be a plotter. The system unit 411 includes a microprocessor 431 of a known type, random access memory (RAM) 432, and a hard disk drive 433. The hard disk drive 433 stores information which includes the NPT program 436 embodying the present invention, as well as data 437. The data 437 includes a definition of a wireless network such as the network shown at 10 in FIG. 1, and also data defining various types of standard and smart antennas that are available for use in a network, including operational information such as performance characteristics in various terrain types, and so forth. The processor 431 executes the program 436, using the RAM 432 to store at least part of the program, and to store a working version of at least part of the data 437, as well as other information such as internal variables used by the program 436.

The present invention provides a number of technical advantages. One such advantage is the provision of a technique by which smart antennas can be accurately and efficiently modeled in an NPT program. The present invention achieves this while avoiding the use of complex and time-consuming algorithms such as Monte Carlo simulation. Instead, the present invention uses an approach which, to a significant extent, draws on calculation capabilities and other capabilities that are already present in the engines of existing NPT programs, in combination with information on the performance characteristics of smart antennas for both uplink and downlink signals in various terrain/environment types, thereby avoiding radical changes to the configuration and operation of existing NPT programs.

The addition of capability to model smart antennas will permit network planners to use NPT programs to integrate smart antennas into existing and new wireless networks, in a manner which ensures adequate downlink coverage, which reduces or eliminates interference, and which facilitates verification of compliance with government regulations. This will also help the network planner insert extra call capacity with confidence that interference conditions will not preclude the requested density of frequency reuse.

A further advantage of the present invention is that it provides techniques by which an NPT program can conveniently evaluate uplink signal interference at a base station with respect to mobile units which are both local and remote. A further feature is that, by maintaining as much continuity and similarity as possible with existing NPT programs, network planners who are already familiar with NPT programs can use new NPT programs that embody the present invention with little or no additional training.

Although one embodiment has been illustrated and described detail, it should be understood that various substitutions and alternations can be made thereto without departing from the scope of the invention. For example, various features of the present invention have been described in association with what is commonly known as the 7/3 frequency allocation configuration, but it will be recognized that the present invention is equally applicable to a variety of other configurations and wireless standards. Further, the disclosed embodiment has been described in association with a switched-beam antenna (which has four beams for transmit and receive), and an adaptive beam-forming antenna (which has a transmit function modeled on a four-beam switched-beam approach and a receive function that adapts its pattern to improve the desired signal and reject any undesired signals), but it will be recognized that variations are possible, including changes in the number of beams.

In addition, the disclosed embodiment presents some examples of specific ways to allocate frequencies approximately randomly among transmit beams of a smart antenna, but it will be recognized that there are a variety of ways in which frequencies can be allocated so as to approximate the random allocation. Other substitutions and alterations are also possible without departing from the spirit and scope of the present invention, as defined by the following claims.

What is claimed is:

1. A method comprising the step of modeling a smart antenna which has a directional operating region and which is operative with respect to a frequency group that includes a plurality of frequencies which are different, said modeling step including the steps of:

representing a transmit pattern of said smart antenna with a plurality of beams that each correspond to a respective different portion of said operating region; and assigning said frequencies of said group approximately randomly among said plurality of beams, each said frequency of said frequency group being assigned to one of said beams.

2. A method according to claim 1, including the steps of:

providing a further antenna and a network of cells which includes first and second cells respectively associated with said smart and further antennas, said cells of said network each having at least two cell sections, and said further antenna having a directional operating region and being operative with respect to said frequencies in said frequency group, said directional operating regions of said smart and further antennas each including a selected one of the cell sections of the associated cell and excluding all other cell sections of the associated cell; and evaluating an operational characteristic relating to at least one of said smart and further antennas.

3. A method according to claim 2, including the step of orienting said smart and further antennas so that said directional operating regions thereof extend outwardly therefrom in approximately the same direction.

4. A method according to claim 2, including the steps of:
defining an antenna list which lists a plurality of different smart antennas, and which associates with each said smart antenna in said antenna list a plurality of expected operational characteristics thereof which each correspond to a respective one of a plurality of terrain types; and
selecting said smart antenna for said first cell from said antennas in said antenna list prior to said representing and assigning steps, said selecting step including the steps of identifying for said one cell section of said first cell a corresponding one of said terrain types, and then selecting one of said antennas from said antenna group as a function of said expected operational characteristics for the identified terrain type.

5. A method according to claim 4, wherein said evaluating step includes the step of determining whether said operational characteristic satisfies a predetermined criteria; and including the further step of responding to a determination in said evaluating step that said operational characteristic fails to meet said predetermined criteria by implementing an adjustment and then repeating said evaluating step, said adjustment including for said smart antenna at least one of adjusting an antenna transmit power, adjusting an antenna height, adjusting an antenna downward angle, adjusting an antenna orientation about a vertical axis.

6. A method according to claim 4, wherein said evaluating step includes the step of determining whether said operational characteristic satisfies a predetermined criteria; and including the further step of responding to a determination in said evaluating step that said operational characteristic fails to meet said predetermined criteria by reassigning said frequencies of said group approximately randomly among said plurality of beams in a manner different from the random assignment during said assigning step, and by then repeating said evaluating step.

7. A method according to claim 4, wherein said evaluating step includes the step of determining whether said operational characteristic satisfies a predetermined criteria; and including the further step of responding to a determination in said evaluating step that said operational characteristic fails to meet said predetermined criteria by selecting for said one cell section of said first cell a different one of said smart antennas in said antenna list, and by thereafter repeating said representing, assigning and evaluating steps.

8. A method according to claim 2, wherein said evaluating step includes the step of determining, for a selected said frequency from said frequency group and at each of a plurality of different evaluation points within said one cell section of one of said first and second cells, whether a predetermined value is less than a difference between power levels of respective electromagnetic signals from said smart antenna and said further antenna.

9. A method according to claim 2, wherein said evaluating step includes the step of determining, at each of a plurality of different evaluation points within a part of said one cell section of said first cell which is associated with said portion of said operating region of said smart antenna corresponding to a selected frequency of said frequency group, whether a power level of an electromagnetic signal transmitted at said selected frequency by said smart antenna is above a predetermined threshold.

10. A method according to claim 1, including the step of selecting as said smart antenna one of a switched-beam antenna and an adaptive beam forming antenna.

11. A method for modeling a wireless network which has a plurality of cells that each include at least two cell sections, and which has an antenna serving a first of said cell sections and capable of receiving signals transmitted at a selected frequency, said method comprising the steps of:
determining a first power level representing an effective power level as to said antenna for a first signal transmitted at said selected frequency by a hypothetical first mobile transmitter disposed within said first cell section;
determining a second power level representing an effective power level as to said antenna for a second signal transmitted at said selected frequency by a hypothetical second mobile transmitter disposed within a second of said cell sections different from said first cell section; and
evaluating whether a predetermined value is greater than a difference between said first and second power levels.

12. A method according to claim 11, wherein said determining and evaluating steps are carried out for each of a plurality of different evaluation points within said first cell section.

13. A method according to claim 12, wherein said step of determining said first power level includes the step of calculating for each said evaluation point the attenuated power level which a signal transmitted by the first mobile transmitter from that evaluation point would be expected to have at said antenna in view of a terrain type present in said first cell section.

14. A method according to claim 13, including the steps of:
making an empirical measurement of the actual attenuation in power level of a signal transmitted at said selected frequency from a selected one of said evaluation points to a location corresponding to said antenna; and
using said measured actual attenuation to adjust the attenuated power levels calculated for each of a plurality of said evaluation points in a group which includes said selected evaluation point.

15. A method according to claim 12, wherein said antenna is a smart antenna, and wherein said step of determining said second power level includes the step of calculating for each said evaluation point the attenuated power level which a signal transmitted at said selected frequency by the second mobile transmitter would be expected to have at that evaluation point.

16. A method according to claim 15, including the steps of:
making an empirical measurement of the actual attenuation in power level of a signal transmitted at said selected frequency from said second cell section to a location corresponding to a selected one of said evaluation points; and
using said measured actual attenuation to adjust the attenuated power levels calculated for each of a plurality of said evaluation points in a group which includes said selected evaluation point.

17. A method according to claim 15, wherein said modeled network includes a further antenna associated with said second cell section, and wherein said calculating step includes the step of using said further antenna to simulate said second mobile transmitter by:
setting modeling characteristics for said further antenna to include at least one of: a height approximately four feet above the ground, an approximately omnidirectional transmit pattern, a transmit power corresponding to the transmit power of an actual mobile transmitter, and a transmit frequency which is said selected frequency; and calculating at each said second power level the expected attenuated power level for a respective signal transmitted from said further antenna to a respective said evaluation point across the type of terrain present between said further antenna and that evaluation point.

18. A method according to claim 12, wherein said antenna is a smart antenna having an adaptive receive capability and having for each of a plurality of terrain types a respective predefined improvement factor, and including after said determining steps and prior to said evaluating step the further step of adjusting for each said evaluation point at least one of said first and second power levels associated therewith in a manner which increases a differential therebetween by an amount which is a function of said improvement factor corresponding to the terrain type present in said first cell section.

19. A method according to claim 18, wherein said adjustment for said improvement factor is effected by one of: increasing said first power level by said improvement factor, decreasing said second power level by said improvement factor, and respectively increasing and decreasing said first and second power levels by respective first and second values that have a sum equal to said improvement factor.

20. A method according to claim 12, wherein said antenna is a smart antenna, and including the steps of:

defining an antenna list which lists a plurality of different smart antennas, and associating with each said smart antenna in said antenna list a plurality of expected operational characteristics thereof which each correspond to a respective one of a plurality of terrain types; and selecting said smart antenna for said first cell section from said antennas in said antenna list prior to said determining and evaluating steps, said selecting step including the steps of identifying for said first cell section the terrain type actually present therein, and then selecting one of said antennas from said antenna group as a function of said expected operational characteristics for the identified terrain type.

21. A method according to claim 11, wherein said antenna is a smart antenna having characteristics that permit selective rejection of signals from a specified number of transmitters;

including the step of determining a plurality of further power levels which each represent an effective power level as to said antenna for a respective further signal transmitted at said selected frequency by a respective further mobile transmitter disposed in a respective further said cell section, said further cell sections being different from each other and from each of said first and second cell sections;

including the step of carrying out each of said determining and evaluating steps for each frequency in a frequency group that includes said selected frequency; and wherein said evaluating step includes the steps of determining the number of said transmitters for which at least one of said differences exceeds said predetermined value, identifying as operationally acceptable a situation where said specified number is not exceeded by said number of transmitters, and identifying as operationally unacceptable a situation where said specified number is exceeded by said number of transmitters.

22. A computer-readable medium encoded with a program with the capability to model a smart antenna which has a directional operating region and which is operative with respect to a frequency group that includes a plurality of frequencies which are different, wherein said program is operable when executed to:

represent a transmit pattern of said smart antenna with a plurality of beams that each correspond to a respective different portion of said operating region; and assign said frequencies of said group approximately randomly among said plurality of beams, each said frequency of said frequency group being assigned to one of said beams.

23. A computer-readable medium according to claim 22, wherein said program is operable when executed to:

recognize a further antenna and a network of cells which includes first and second cells respectively associated with said smart and further antennas, said cells of said network each having at least two cell sections, and said further antenna having a directional operating region and being operative with respect to said frequencies in said frequency group, said directional operating regions of said smart and further antennas each including a selected one of the cell sections of the associated cell and excluding all other cell sections of the associated cell; and evaluate an operational characteristic relating to at least one of said smart and further antennas.

24. A computer-readable medium encoded with a program capable of modeling a wireless network which has a plurality of cells that each include at least two cell sections, and which has an antenna serving a first of said cell sections and capable of receiving signals transmitted at a selected frequency, said program being operable when executed to:

determine a first power level representing an effective power level as to said antenna for a first signal transmitted at said selected frequency by a hypothetical first mobile transmitter disposed within said first cell section;

determine a second power level representing an effective power level as to said antenna for a second signal transmitted at said selected frequency by a hypothetical second mobile transmitter disposed within a second of said cell sections different from said first cell section; and evaluate whether a predetermined value is greater than a difference between said first and second power levels.

25. A computer-readable medium according to claim 24, wherein said program is further operable when executed to carry out, for each of a plurality of different evaluation points within said first cell section, said determining of said first and second power levels and said evaluation of said difference with respect to said predetermined value.

* * * * *